(12) United States Patent
Mori

(10) Patent No.: US 11,305,383 B2
(45) Date of Patent: Apr. 19, 2022

(54) LASER MACHINE

(71) Applicant: FANUC CORPORATION, Yamanashi (JP)

(72) Inventor: Atsushi Mori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 161 days.

(21) Appl. No.: 16/269,978

(22) Filed: Feb. 7, 2019

(65) Prior Publication Data

US 2019/0255660 A1 Aug. 22, 2019

(30) Foreign Application Priority Data

Feb. 19, 2018 (JP) .............................. JP2018-027003

(51) Int. Cl.
*B23K 26/388* (2014.01)
*B23K 26/06* (2014.01)
*B23K 26/08* (2014.01)

(52) U.S. Cl.
CPC ........ *B23K 26/388* (2013.01); *B23K 26/0643* (2013.01); *B23K 26/0648* (2013.01);
(Continued)

(58) Field of Classification Search
CPC .............. B23K 26/388; B23K 26/0643; B23K 26/0648; B23K 26/0652; B23K 26/0665;
(Continued)

(56) References Cited

U.S. PATENT DOCUMENTS

| 2009/0046340 A1* | 2/2009 | Reimer | G02B 26/06 |
| | | | 359/196.1 |
| 2016/0062036 A1* | 3/2016 | Mori | H01S 3/0064 |
| | | | 250/492.1 |

(Continued)

FOREIGN PATENT DOCUMENTS

| CN | 105555465 A | 5/2016 |
| JP | 2000-141070 A | 5/2000 |

(Continued)

OTHER PUBLICATIONS

An Office Action mailed by the Japanese Patent Office dated Feb. 12, 2020, which corresponds to Japanese Patent Application No. 2018-027003 and is related to U.S. Appl. No. 16/269,978.

(Continued)

*Primary Examiner* — Tu B Hoang
*Assistant Examiner* — Alba T Rosario-Aponte
(74) *Attorney, Agent, or Firm* — Studebaker & Brackett PC

(57) ABSTRACT

A laser machine comprises: a head including optical parts allowing reflection of a laser beam or allowing the laser beam to pass through, while being rotatable about rotary axes, and a focusing optical system that focuses the laser beam; a moving mechanism that allows the head and a target to move relative to each other; and a control unit that controls rotations of the optical parts in such a manner that an irradiation intended position to be reached by an emission optical axis when the laser beam is emitted to the target moves in a curvilinear pattern or a linear pattern, controls movement by the moving mechanism so as to move the head and the target relative to each other, and controls emission output from the laser source so as to change a condition for emitting the laser beam based on the rotation angles of the optical parts.

11 Claims, 23 Drawing Sheets

(52) U.S. Cl.
CPC ...... *B23K 26/0652* (2013.01); *B23K 26/0665* (2013.01); *B23K 26/08* (2013.01); *B23K 26/0884* (2013.01); *B23K 26/0892* (2013.01)

(58) Field of Classification Search
CPC . B23K 26/08; B23K 26/0884; B23K 26/0892
USPC ... 219/121.7, 121.67, 121.6, 121.61, 121.62, 219/121.63, 121.65, 121.73, 121.74, 219/121.78, 121.79, 121.8, 121.81, 219/121.82
See application file for complete search history.

(56) References Cited

U.S. PATENT DOCUMENTS

2016/0354867 A1* 12/2016 Matsuoka .......... B23K 26/0876
2018/0157006 A1*  6/2018 Aslanov ............... G02B 26/101

FOREIGN PATENT DOCUMENTS

| JP | 2004-136307 A | 5/2004 |
| JP | 0006071641 B2 | 2/2017 |
| WO | 2015-129248 A1 | 9/2015 |

OTHER PUBLICATIONS

An Office Action mailed by China National Intellectual Property Administration dated Nov. 4, 2020, which corresponds to Chinese Patent Application No. 201910114097.1 and is related to U.S. Appl. No. 16/269,978; with English language translation.

* cited by examiner

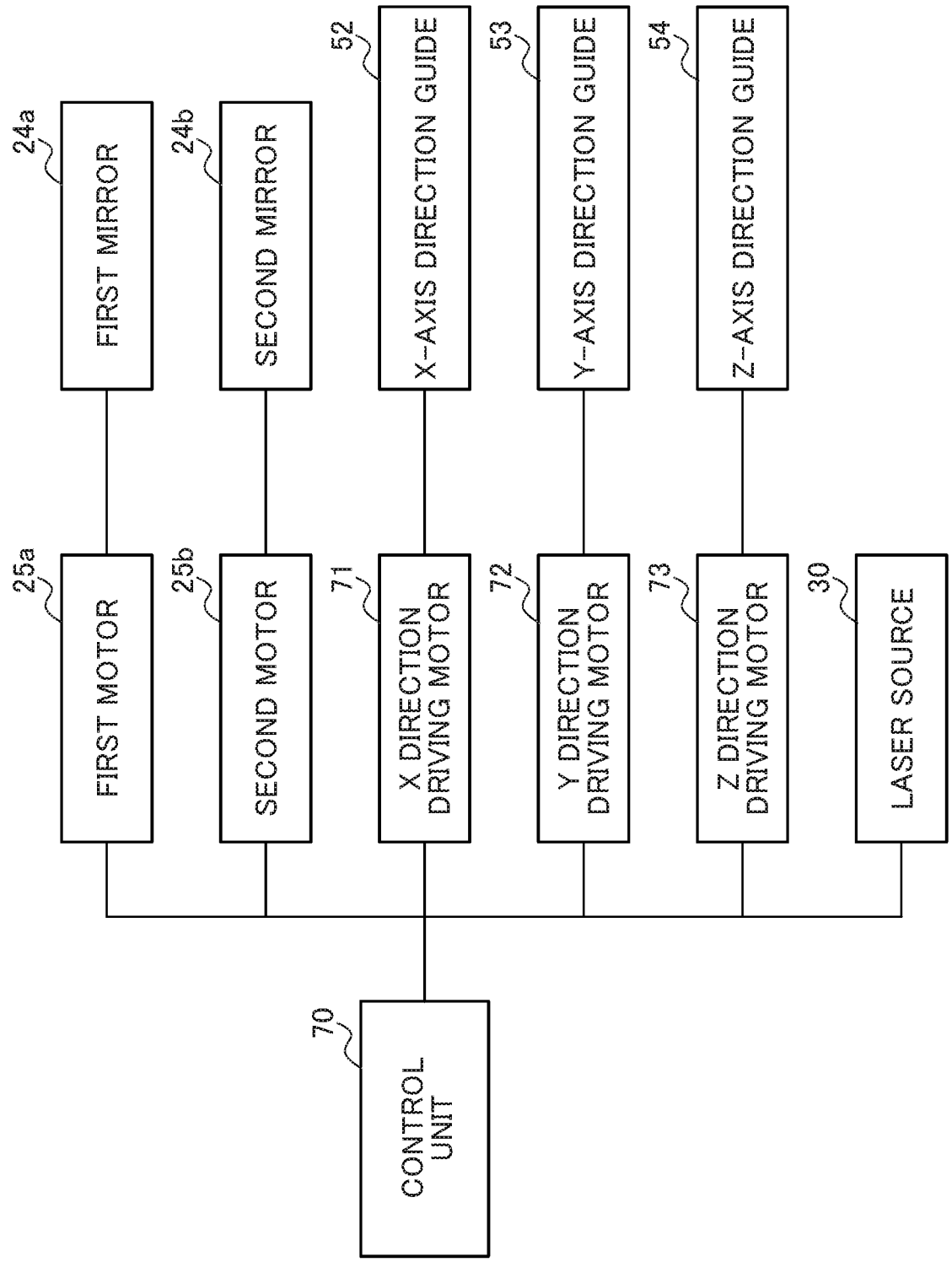

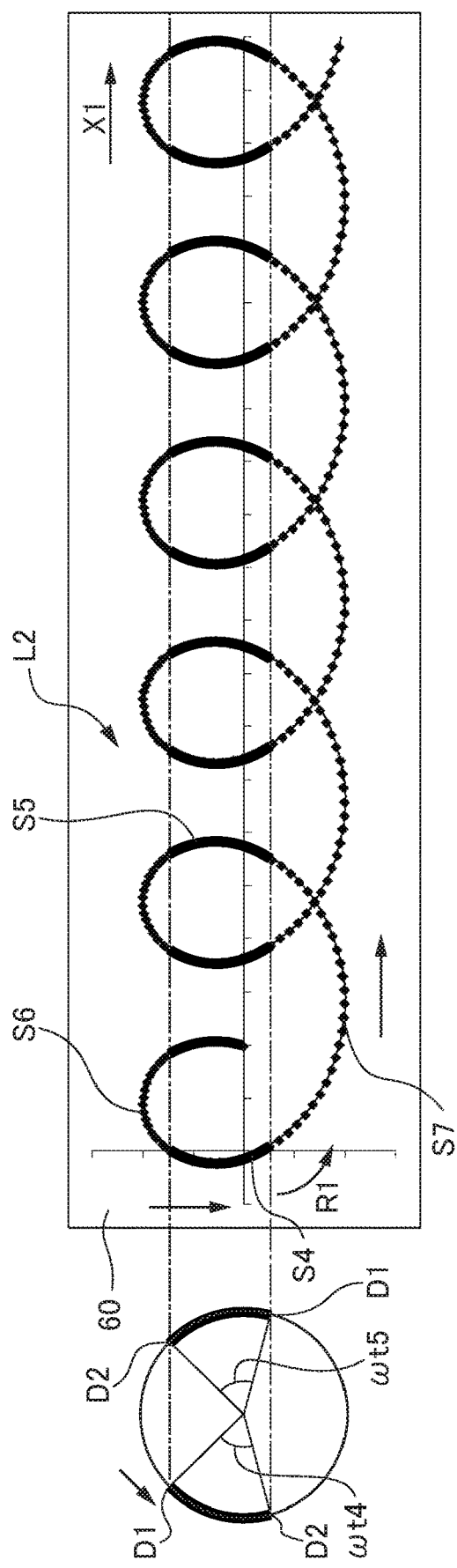

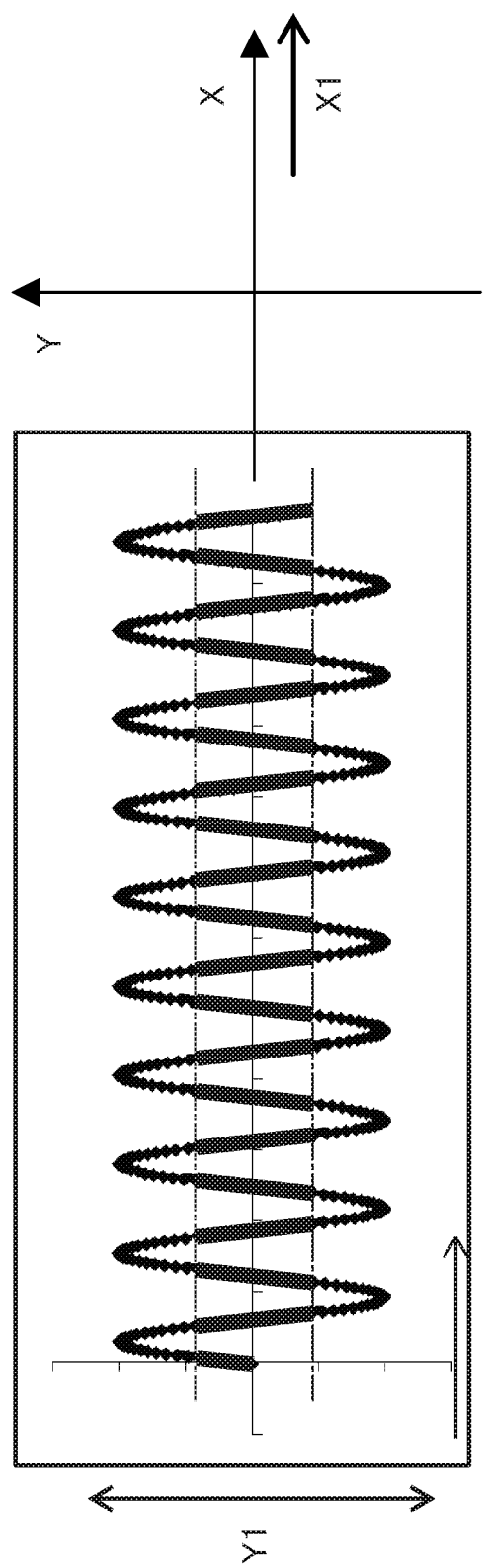

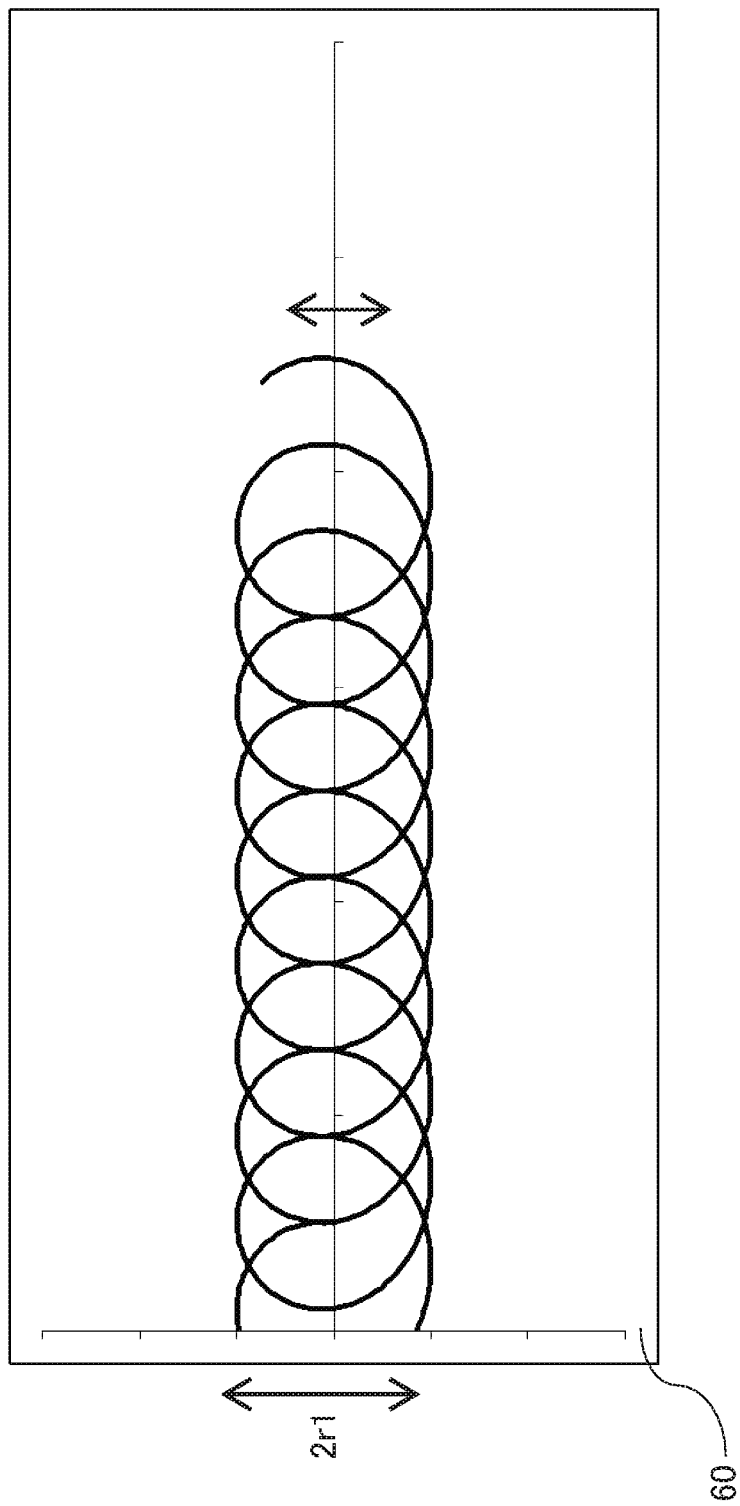

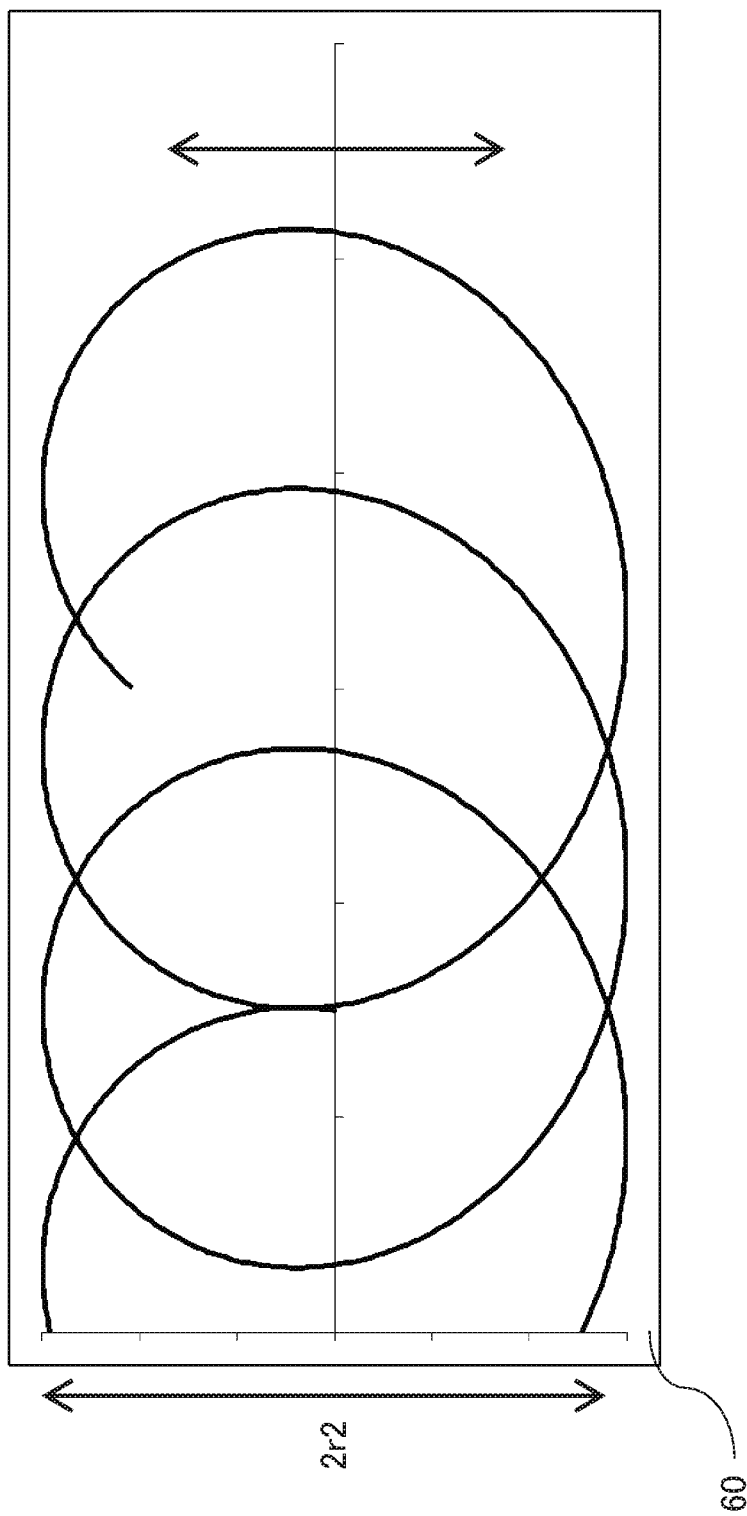

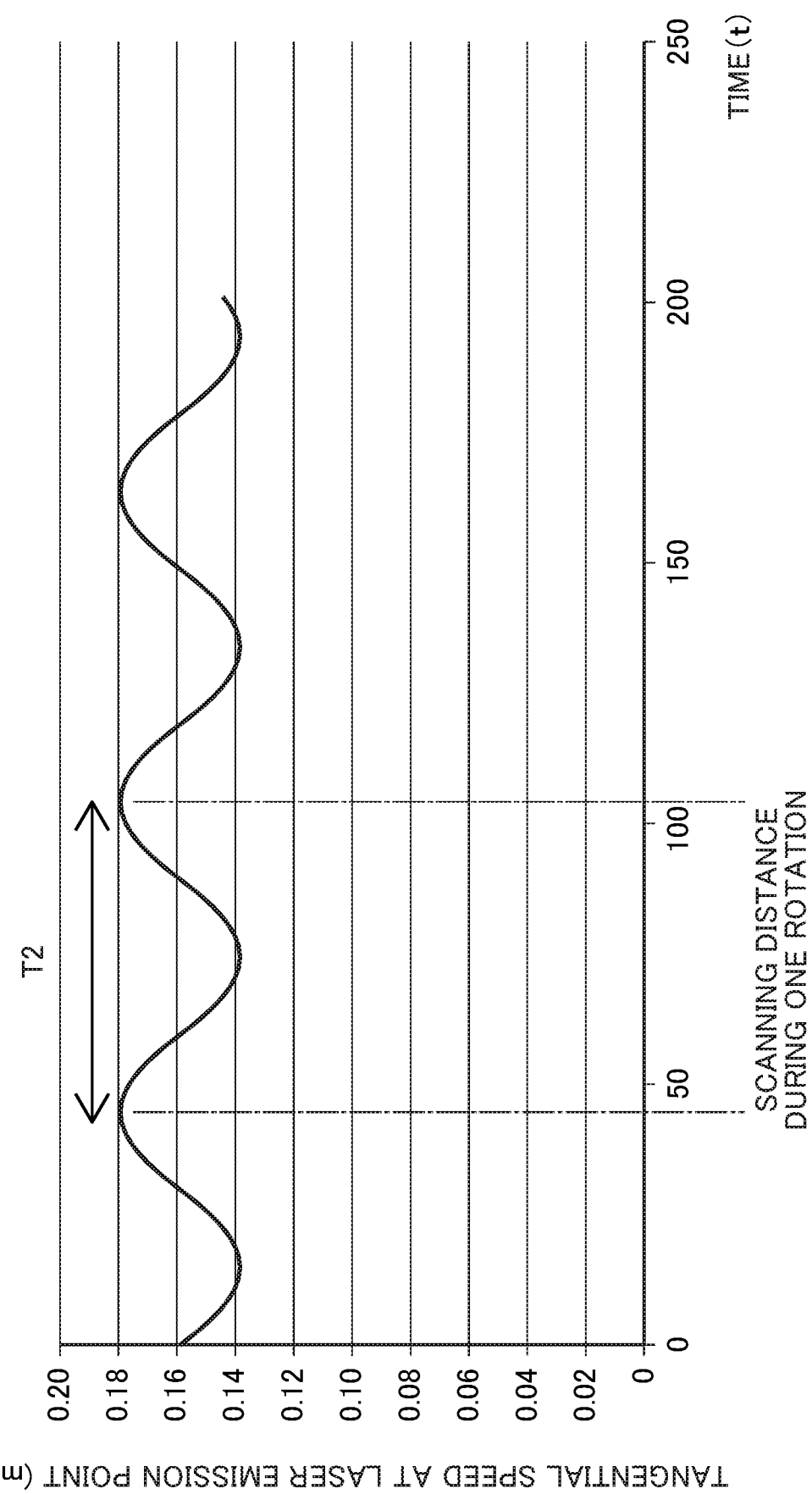

LASER MACHINE

This application is based on and claims the benefit of priority from Japanese Patent Application No. 2018-027003, filed on 19 Feb. 2018, the content of which is incorporated herein by reference.

BACKGROUND OF THE INVENTION

Field of the Invention

The present invention relates to a laser machine for machining a machining target by irradiating the machining target with a laser beam.

Related Art

According to a technique conventionally known for a laser machine, an optical part such as a trepanning head is rotated at a constant speed and a laser beam is deflected and applied to a machining target (hereinafter also called a "workpiece"), thereby machining the workpiece. There is also a known device that emits a laser beam so as to draw a path like a cycloid curve on a workpiece by moving a machining head as a laser irradiation unit of the foregoing laser machine and the workpiece relative to each other.

For example, patent document 1 discloses a technique of machining a workpiece by irradiating the workpiece with a laser beam while a machining head is moved relative to the workpiece. In contrast to this technique, according to a technique disclosed in patent document 2, a workpiece is machined by being irradiated with a laser beam while the workpiece is moved relative to a machining head.

More specifically, according to the technique disclosed in patent document 1, the machining head includes a first prism and a second prism. While the first prism and the second prism are rotated to cause a laser beam to make swinging motion, the machining head moves straight ahead on the workpiece, thereby machining the workpiece with the laser beam.

According to the technique disclosed in patent document 2, the machining head includes a pair of prisms. While the pair of prisms is rotated to cause a laser beam to make swinging motion, the machining head machines a plate member moving straight ahead.

Patent Document 1: Japanese Patent No. 6071641
Patent Document 2: Japanese Unexamined Patent Application, Publication No. 2000-141070

SUMMARY OF THE INVENTION

However, a speed of laser beam scanning is not constant. Hence, if movement of an optical part relative to a workpiece is added to rotation of the emission optical axis of a laser beam, a result of laser irradiation at a machining target becomes nonuniform.

As a result of swinging motion of a laser beam caused by rotation of an optical part in a machining head and motion for moving the machining head and a workpiece relative to each other, a point on the workpiece irradiated with the laser beam is to draw a path such as a cycloid curve. At this time, a scanning speed at a point of irradiation on the workpiece with the laser beam becomes unstable. For example, irradiating the workpiece with a laser beam of a constant output changes the quantity of heat input per unit length along a path of an irradiation point. Hence, a produced result of the laser machining becomes nonuniform.

Even if power control is executed in response to this issue by changing the intensity of a laser beam in response to a speed of laser beam scanning, it becomes impossible in some cases to acquire a desired result of the laser machining as an irradiation result at a high-speed section scanned with the laser beam at a high speed and as an irradiation result at a low-speed section scanned with the laser beam at a low speed. The reason for this is that, even with the same heat input per unit length of a workpiece, thermal conduction through a material takes some time. Hence, resultant machining phenomena do not agree with each other.

Thus, it is an object of the present invention to provide a laser machine intended for laser beam irradiation with movement of an optical part relative to a workpiece added to rotation of the emission optical axis of a laser beam as described above, and capable of realizing laser machining under a machining condition allowing a favorable machining speed and favorable laser irradiation.

(1) The present invention relates to a laser machine (laser machine 100 described later, for example) comprising: a machining head (machining head 12 described later, for example) including a laser source (laser source 30 described later, for example) that emits a laser beam, an optical part (first mirror 24a, second mirror 24b, mirror 24c described later, for example) allowing reflection of the laser beam (laser beam LL described later, for example) or allowing the laser beam to pass through, while being rotatable about a rotary axis (rotary axis W1, W2, W3 described later, for example), and a focusing optical system (third lens 23 described later, for example) that focuses the laser beam; a moving mechanism (moving mechanism 50 described later, for example) that allows the machining head and a machining target (workpiece 60 described later, for example) to be machined with the laser beam to move relative to each other; and a control unit (control unit 70 described later, for example) that controls rotation of the optical part in such a manner that an irradiation intended position to be reached by an emission optical axis when the laser beam is emitted to the machining target moves in a curvilinear pattern or a linear pattern, controls movement by the moving mechanism so as to move the machining head and the machining target relative to each other, and controls emission output from the laser source so as to change a condition for emitting the laser beam based on the rotation angle of the optical part.

(2) In the laser machine described in (1), the condition for emitting the laser beam may be fulfilled by setting emission output from the laser source at a first output value if the rotation angle of the optical part is in a predetermined rotation angle range, and the condition for emitting the laser beam may be fulfilled by setting emission output from the laser source at a second output value smaller than the first output value or off if the rotation angle of the optical part is out of the predetermined rotation angle range.

(3) In the laser machine described in (2), the control unit may execute control so as to change the rotation angle range based on a relative move direction (relative move direction X1 described later, for example) in which the machining head is moved relative to the machining target.

(4) In the laser machine described in any one of (1) to (3), the control unit may control emission output from the laser source so as to change the condition for emitting the laser beam based on the absolute value of a composite speed obtained by combining a relative move speed at which the machining head is moved relative to the machining target and a tangential speed at which scanning with the emission optical axis proceeds in a curvilinear pattern.

(5) In the laser machine described in any one of (1) to (4), the optical part may include multiple optical parts, and the control unit may execute control so as to rotate the multiple optical parts at the same rotation number and in the same direction while maintaining the respective phases of the multiple optical parts.

(6) In the laser machine described in any one of (1) to (4), the optical part may include multiple optical parts, and the control unit may execute control so as to rotate the multiple optical parts at the same rotation number and in opposite directions.

(7) In the laser machine described in (6), the control unit may execute control so as to change the phases of the multiple optical parts rotating in the opposite directions based on a relative move direction in which the machining head is moved relative to the machining target and a direction in which the emission optical axis makes linear reciprocating motion.

(8) In the laser machine described in any one of (1) to (5), the control unit may execute control so as to change the rotation number of the optical part based on a relative move speed at which the machining head is moved relative to the machining target and a tangential speed at which scanning with the emission optical axis proceeds in a curvilinear pattern.

(9) In the laser machine described in any one of (1) to (8), the control unit may execute control so as to change the magnitude of the amplitude of curvilinear motion or linear reciprocating motion of the laser beam in response to input of a width of irradiation of the machining target with the laser beam.

The present invention can provide a laser machine capable of performing laser machining under a machining condition allowing a favorable machining speed and favorable laser irradiation.

BRIEF DESCRIPTION OF THE DRAWINGS

FIG. 2B is a control block diagram about a control unit forming the laser machine according to the embodiment of the present invention;

FIG. 4B is a schematic view showing the intensity of laser beam irradiation by the laser machine according to the embodiment of the present invention;

FIG. 7A is a schematic view showing a relationship between a relative move direction of a machining head in a laser machine according to a second modification of the present invention and a direction in which the emission optical axis of a laser beam makes linear reciprocating motion;

FIG. 8A is a schematic view showing the width of laser machining by a laser machine according to a fifth modification of the present invention;

FIG. 8B is a schematic view showing the width of laser machining by the laser machine according to the fifth modification of the present invention;

FIG. 9B is a graph showing a relationship of a tangential speed at a laser irradiation point responsive to input of the width of laser machining by the laser machine according to the fifth modification of the present invention with time;

DETAILED DESCRIPTION OF THE INVENTION

[Entire Configuration of Laser Machine 100]

Figure 1:
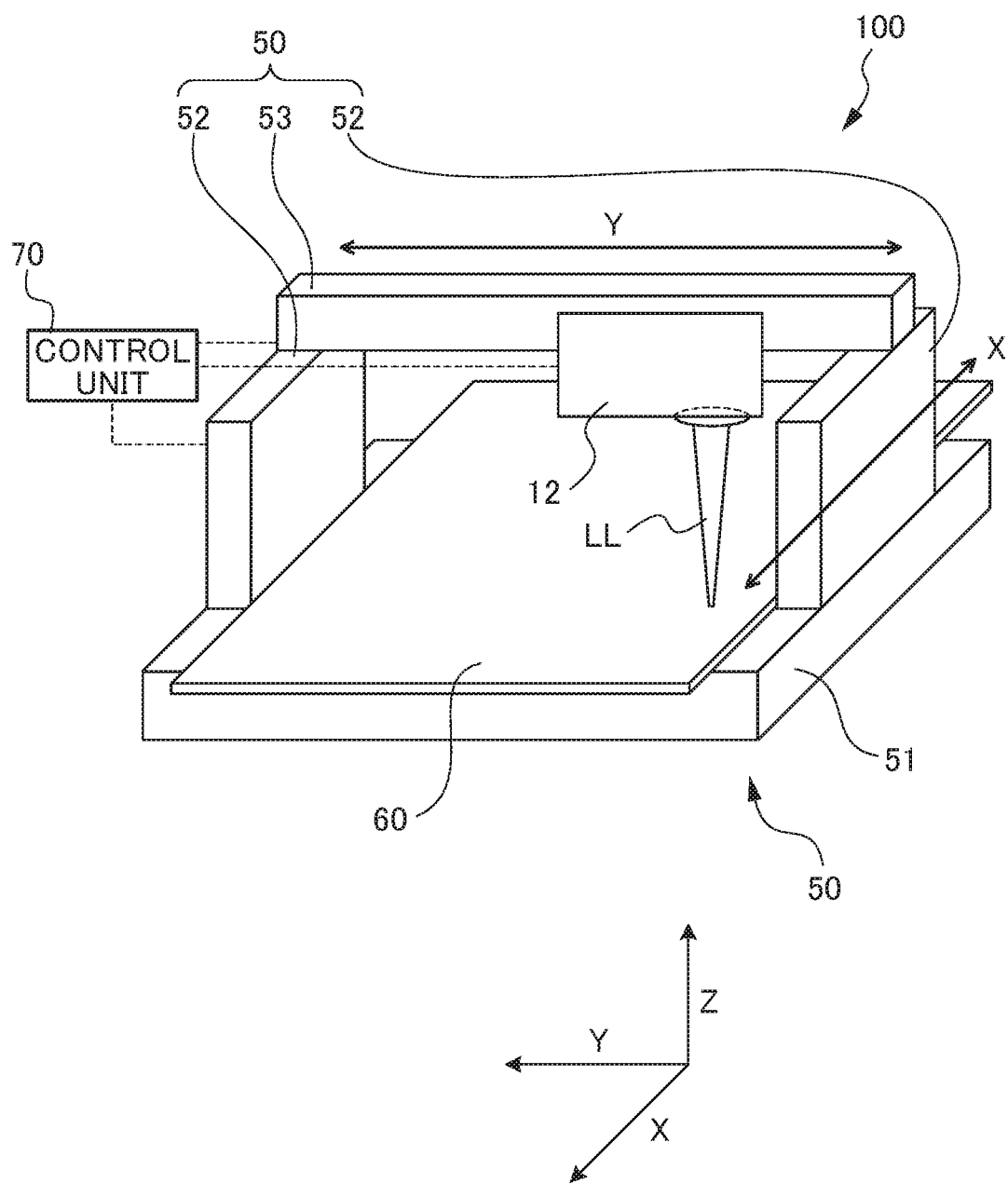
FIG. 1 is a perspective view showing the configuration of a laser machine according to an embodiment of the present invention.

FIG. 1 is a perspective view showing the configuration of a general laser machine 100. The laser machine 100 is a device for machining a workpiece 60 by irradiating the workpiece 60 as a machining target with a laser beam LL. The laser machine 100 includes a machining table 51, a moving mechanism 50, and a machining head 12. The machining table 51 is a table for placement of the workpiece 60 thereon. The workpiece 60 is fixed onto the machining table 51.

The moving mechanism 50 in the general laser machine includes an X-axis direction guide 52, a Y-axis direction guide 53, and a Z-axis direction guide 54 (see FIG. 2B) not shown in FIG. 1. The machining head 12 is installed on the Z-axis direction guide 54. The Z-axis direction guide 54 is installed on the Y-axis direction guide 53. The Y-axis direction guide 53 is installed on the X-axis direction guide 52.

The X-axis direction guide 52 is a mechanism movable in the X-axis direction. The Y-axis direction guide 53 is a mechanism stretching across the machining table 51 and supporting the machining head 12 installed on the Z-axis direction guide 54 so as to make the machining head 12 movable in the Y-axis direction over the machining table 51. The workpiece 60 is installed on the machining table 51 and motion along the X axis and motion along the Y axis are controlled by a servo motor not shown, thereby allowing the machining head 12 on the Z-axis direction guide 54 to move to an arbitrary position above the workpiece 60. Moving the machining head 12 closer to or away from the workpiece 60 using the Z-axis direction guide 54 allows a laser beam focused by a third lens 23 as a focusing optical system to be arranged at a location suitable for laser machining on the workpiece.

Figure 2A:
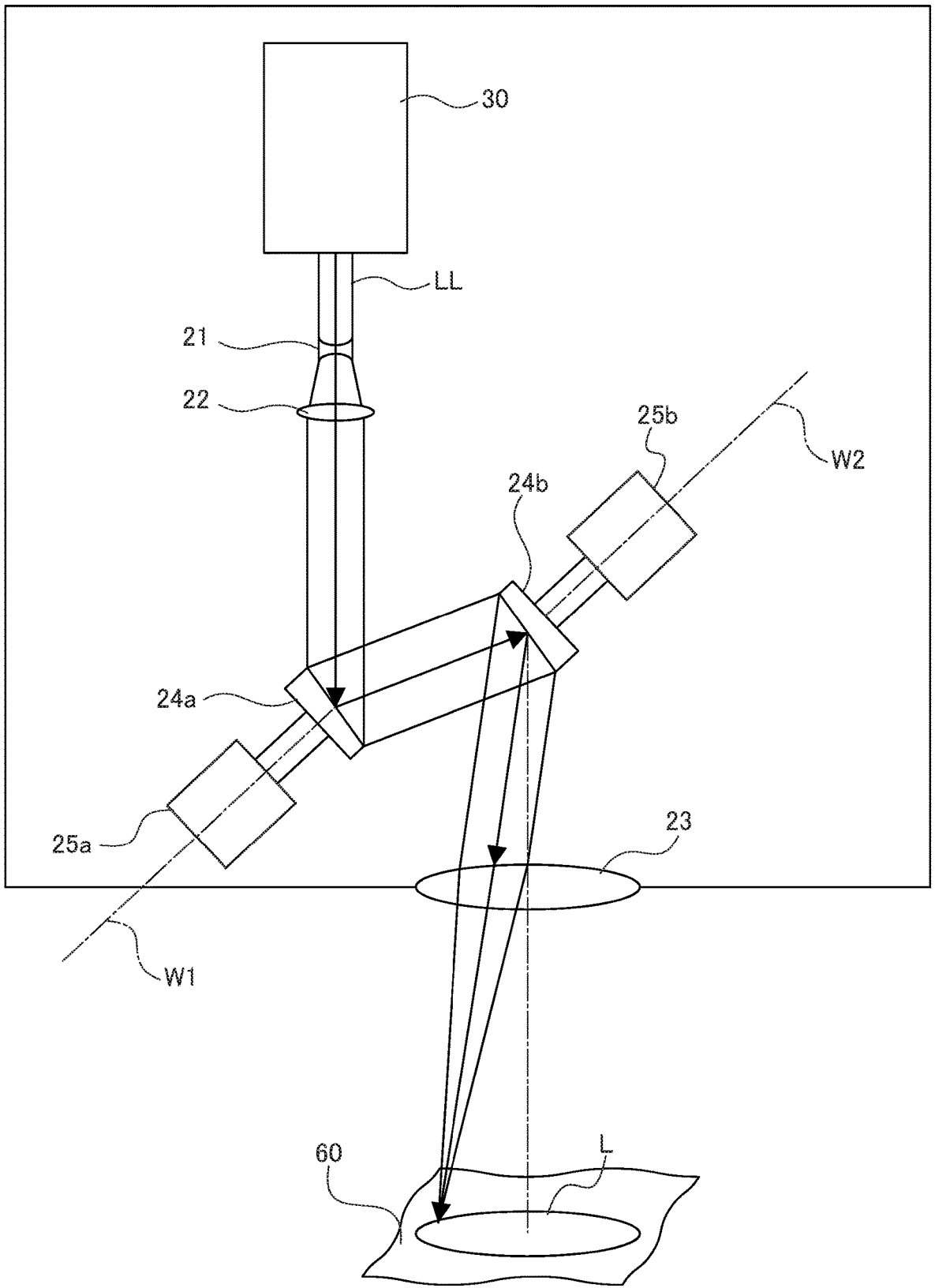
FIG. 2A is a schematic view showing the configuration of a machining head forming the laser machine according to the embodiment of the present invention.

FIG. 2A is a schematic view showing the configuration of the machining head 12. The machining head 12 includes a laser source 30, a first lens 21, a second lens 22, a first mirror 24a and a second mirror 24b as multiple optical parts, a first motor 25a and a second motor 25b as driving parts, and the third lens 23 as a focusing optical system.

The laser beam LL emitted from the laser source 30 is guided to the first lens 21. The first lens 21 is arranged to face an exit of a laser beam at the laser source 30. The first lens 21 is a concave lens and magnifies the laser beam LL emitted from the laser source 30. The second lens 22 is a collimator lens and converts the laser beam LL magnified by the first lens 21 to parallel beams. The laser beam LL converted to the parallel beams is guided to the third lens 23.

The first mirror 24a reflects the laser beam LL having passed through the second lens 22 toward the second mirror 24b. The first motor 25a is attached to the first mirror 24a. Thus, the first mirror 24a rotates in response to rotation of the first motor 25a. A reflecting surface of the first mirror 24a to receive a laser beam is tilted from a surface orthogonal to a rotary axis W1 of the first motor 25a (which is also the rotary axis of the first mirror 24a).

The second mirror 24b reflects the laser beam LL coming from the first mirror 24a toward the third lens 23. The second motor 25b is attached to the second mirror 24b. Thus, the second mirror 24b rotates in response to rotation of the second motor 25b. A reflecting surface of the second mirror 24b is tilted from a surface orthogonal to a rotary axis W2 of the second motor 25b (which is also the rotary axis of the second mirror 24b).

The optical axis of the laser beam after being reflected by the first mirror 24a and the second mirror 24b will be examined. If the reflecting surfaces of the first mirror 24a and the second mirror 24b located on the rotary axes W1 and W2 of the first motor 25a and the second motor 25b are vertical to the rotary axes W1 and W2 respectively, an angle between an incident optical axis and the rotary axis W1 and an angle between an incident optical axis and the rotary axis W2, specifically, incident angles are constant independently of the rotation phases of the first motor 25a and the second motor 25b. In this case, an emission optical axis, specifically, a direction in which the laser beam is reflected also becomes constant accordingly independently of the rotation phases of the first motor 25a and the second motor 25b.

By contrast, if the first mirror 24a and the second mirror 24b are tilted from the surface orthogonal to the rotary axis W1 and the surface orthogonal to the rotary axis W2 respectively, the incident angles change in response to the rotation phases of the first motor 25a and the second motor 25b. In this case, the direction of the emission optical axis also changes in response to the motor rotation phases. As a result, the emission optical axis in the presence of a tilt at the reflecting surface is to swing about the emission optical axis in the absence of the tilt. If the tilt is 10 [mrad], for example, a laser beam is emitted in a direction deflected by 10 [mrad] from the emission optical axis in the absence of the tilt, and the direction of the laser beam depends on the rotation phases of the first motor 25a and the second motor 25b. In this case, if the second mirror 24b and the workpiece 60 are separated by a distance of 300 [mm], for example, an irradiation point on the workpiece 60 is separated by 3 [mm] from an irradiation point in the absence of the tilt. As the first motor 25a and the second motor 25b rotate, the irradiation point moves along a circumference with a radius of 3 mm.

The second mirror 24b functions together with the first mirror 24a to rotate the emission optical axis of the laser beam LL about a virtual optical axis above the workpiece 60. The "emission optical axis" means the optical axis of a laser beam determined if the second mirror 24b is tilted from the surface orthogonal to the rotary axis W2. The "virtual optical axis" is a virtual optical axis connecting the center of the second mirror 24b and the center of the third lens 23.

The third lens 23 is a focusing lens. The third lens 23 focuses the beam reflected by the first mirror 24a and the second mirror 24b, and allows the focused beam to reach the workpiece 60. As a result of the foregoing mechanism, the laser beam LL focused by the third lens 23 draws a circular path L on the workpiece 60.

FIG. 2B is a block diagram showing a configuration relating to a control unit 70. The control unit 70 is connected to the first motor 25a, the second motor 25b, an X direction driving motor 71, a Y direction driving motor 72, and a Z direction driving motor 73 not shown in FIG. 1, and the laser source 30.

The X direction driving motor 71 is connected to the X-axis direction guide 52 and moves the X-axis direction guide 52 in the X-axis direction. The Y direction driving motor 72 moves the machining head 12 in the Y-axis direction through the Y-axis direction guide 53. The Z direction driving motor 73 moves the machining head 12 in the Z-axis direction through the Z-axis direction guide 54.

The description continues by referring back to FIG. 1. The control unit 70 controls driving of the X-axis direction guide 52 and driving of the Y-axis direction guide 53. This moves the machining head 12 and the workpiece 60 relative to each other. The control unit 70 executes control so as to rotate each of the first mirror 24a and the second mirror 24b at a predetermined rotation number at the machining head 12. By doing so, the emission optical axis of the laser beam LL makes curvilinear motion about the virtual optical axis, or the emission optical axis of the laser beam makes linear reciprocating motion centered at the virtual optical axis. The control unit 70 controls emission output from the laser source 30. By doing so, laser irradiation can be performed at predetermined timing under a predetermined laser output condition.

The control unit 70 can also control laser output from the laser source 30 so as to change a condition for laser beam irradiation based on the rotation angles of the first mirror 24a and the second mirror 24b. This control will be described later by referring to FIG. 3 and its subsequent drawings.

An example of the motion of the laser machine 100 will be described briefly. In this example, the control unit 70 executes control so as to move the X-axis direction guide 52 in the X-axis direction. At the same time, the control unit 70 executes control so as to drive the machining head 12, thereby causing the first mirror 24a to rotate about the rotary axis W1 in response to rotation of the first motor 25a, while causing the second mirror 24b to rotate about the rotary axis W2 in response to rotation of the second motor 25b. The first motor 25a and the second motor 25b are controlled so as to rotate at an equal rotation speed while maintaining a difference between their rotation phases. Then, the control unit 70 drives the laser source 30 to emit the laser beam LL from the laser source 30.

At this time, the laser beam LL passes through the first lens 21 and the second lens 22, is reflected by the rotating first mirror 24a and second mirror 24b, is focused by the third lens 23, and then reaches the workpiece 60. In this way, the workpiece 60 is irradiated with the laser beam LL while the laser beam LL forms a spiral path on the workpiece 60.

Figure 3A:
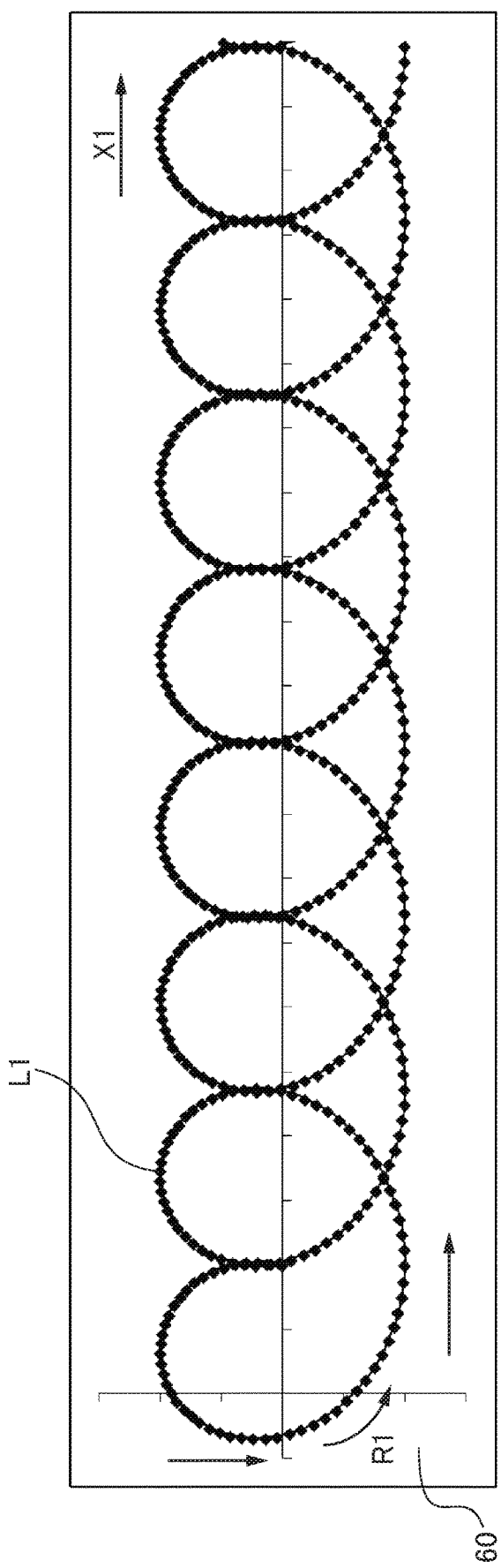
FIG. 3A is a schematic view showing a laser beam path L1 drawn by the laser machine according to the embodiment of the present invention.
Figure 3B:
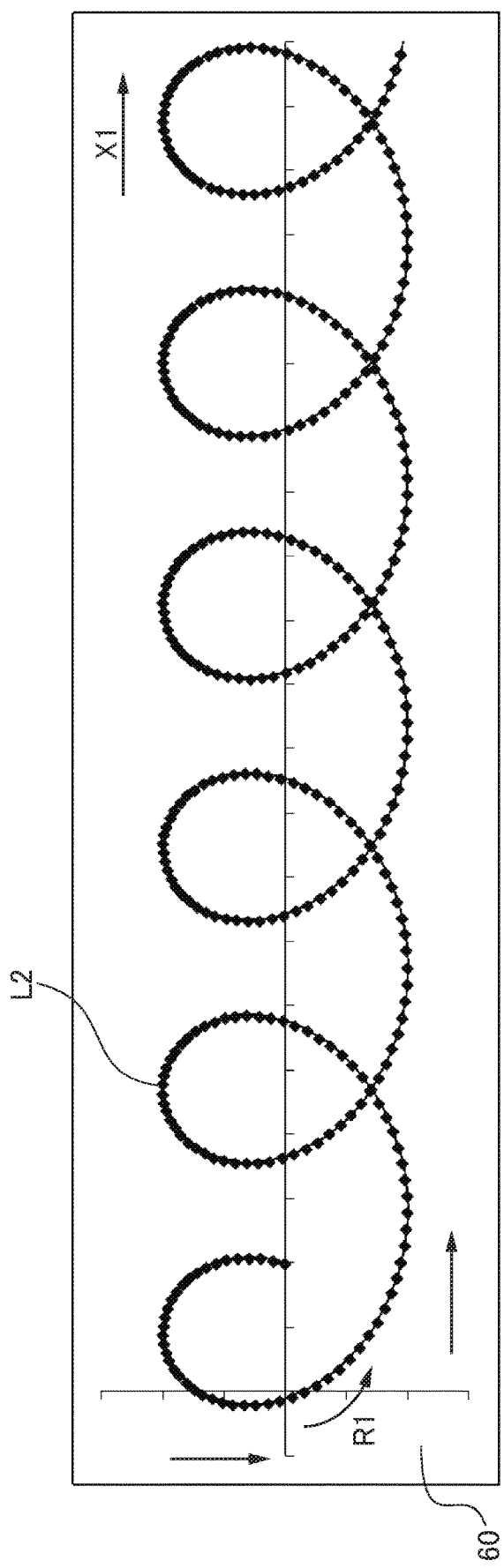
FIG. 3B is a schematic view showing a laser beam path L2 drawn by the laser machine according to the embodiment of the present invention.
Figure 3C:
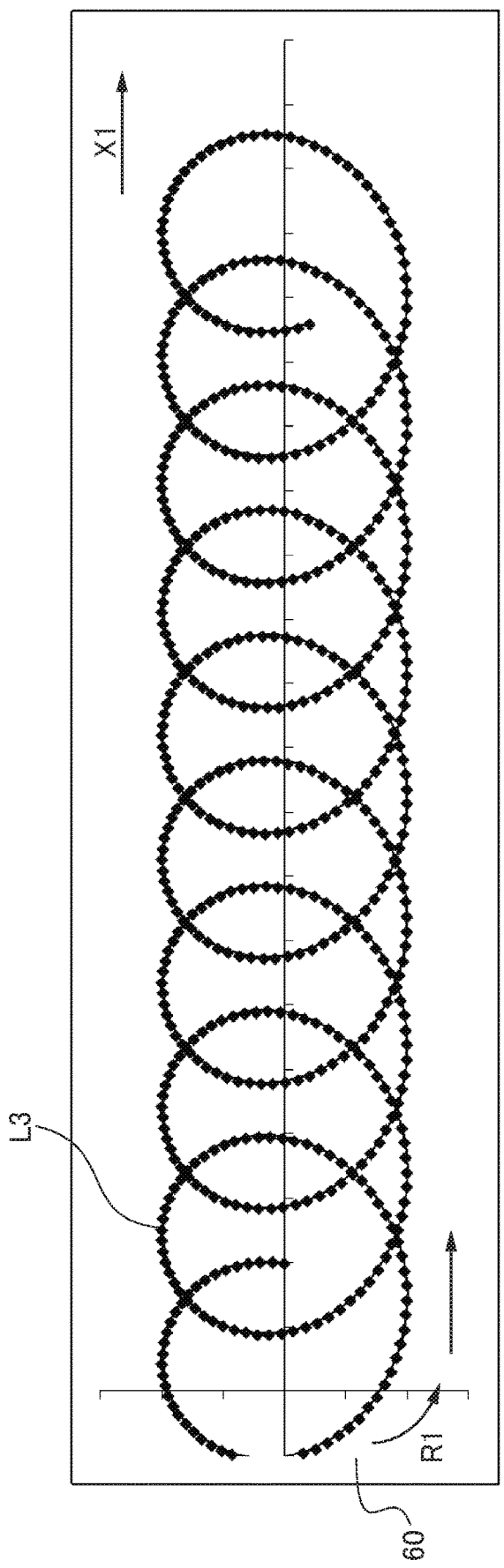
FIG. 3C is a schematic view showing a laser beam path L3 drawn by the laser machine according to the embodiment of the present invention.

FIGS. 3A to 3C are schematic views each showing a path of an irradiation point on the workpiece 60 formed by rotating the first motor 25a and the second motor 25b at the same rotation number while holding the phases of the first motor 25a and the second motor 25b, and by moving the machining head 12 in the X-axis positive direction.

FIG. 3A shows a laser beam path L1 formed when the machining head 12 moves relative to the workpiece 60 in a relative move direction X1 and at a predetermined speed, and each of the first motor 25a and the second motor 25b rotates at a predetermined rotation number. The laser beam path L1 is drawn in a spiral pattern while moving forward in the rightward direction in FIG. 3A. Adjacent curves of the spiral path contact each other. Points on the path show the positions of irradiation points separated by constant time intervals. A narrow interval shows a low speed, whereas a wide interval shows a high speed.

FIG. 3B shows a path formed by movement in the X-axis direction at a higher speed than the speed in FIG. 3A. FIG. 3C shows a path formed by movement in the X-axis direction at a lower speed than the speed in FIG. 3A. These figures show that curves of the paths in these figures overlap in different ways.

Figure 4A:
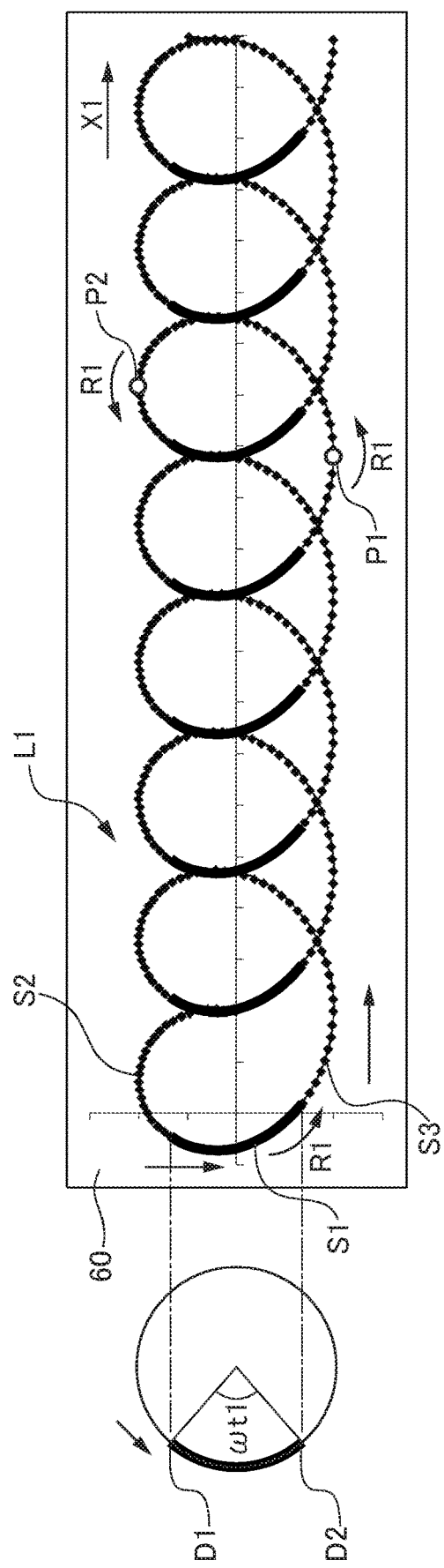
FIG. 4A is a schematic view showing the intensity of laser beam irradiation by the laser machine according to the embodiment of the present invention.
Figure 4C:
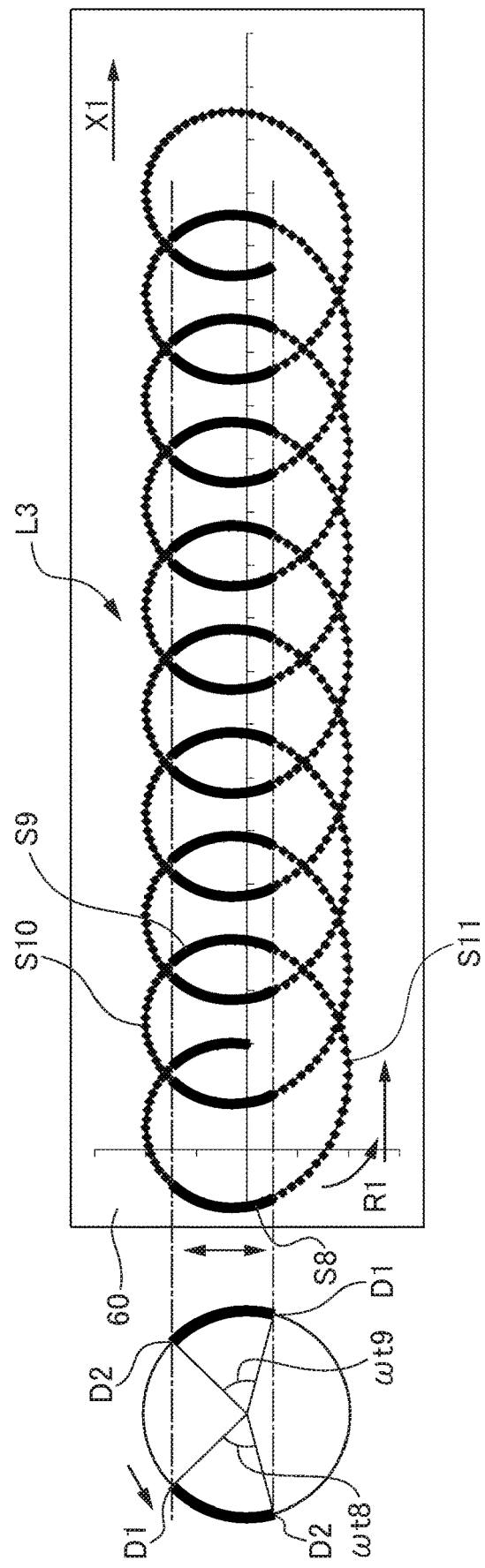
FIG. 4C is a schematic view showing the intensity of laser beam irradiation by the laser machine according to the embodiment of the present invention.

FIGS. 4A to 4C each show the range of laser beam emission determined by rotating the first motor 25a and the second motor 25b at the same rotation number while holding the phases of the first motor 25a and the second motor 25b, like in the cases of FIGS. 3A to 3C. In each of FIGS. 4A to 4C, a section of a path indicated by a bold line shows a section corresponds to emission of a laser beam at a first output value. A section of the path indicated by a narrow line (a line with continuous rectangular dots) corresponds to emission of a laser beam at a second output value smaller than the first output value.

FIG. 4A is a schematic view showing a path of the emission optical axis of a laser beam formed by emitting the laser beam in a range belonging to an intended route of laser beam irradiation (a group of irradiation intended positions intended for laser beam irradiation=a spiral pattern in its entirety), and corresponding to one rotation angle $\omega t1$ ($\omega$ is an angular speed, t is time, and a number after t is a number added for identification) in one cycle. The "irradiation intended position" includes not only a position to be actually irradiated with a laser beam but also includes a position to be irradiated in case of the presence of laser output. The "irradiation intended position" further includes a position not to be irradiated with a laser beam for reason that laser output is 0 W. When the rotation angles of the first mirror 24a and the second mirror 24b are in a predetermined rotation angle range, the emission optical axis of the laser beam is in a range S1 of the rotation angle $\omega t1$ (a section indicated by a bold line in FIG. 4A) located at an upstream side of the relative move direction X1 of the machining head 12. At this time, the control unit 70 controls the laser source 30 so as to emit the laser beam at the first output value.

When the rotation angles of the first mirror 24a and the second mirror 24b are out of the predetermined rotation angle range, the emission optical axis of the laser beam is in a rotation angle range S2 and a rotation angle range S3 (sections indicated by narrow lines in FIG. 4A) other than the range S1 of the rotation angle $\omega t1$. At this time, the control unit 70 controls the laser source 30 so as to emit the laser beam at the second output value smaller than the first output value.

FIG. 4B is a schematic view showing a path of the emission optical axis of a laser beam formed by emitting the laser beam in a range belonging to an intended route of laser beam irradiation (a spiral pattern in its entirety) and corresponding to ranges of two rotation angles $\omega t4$ and $\omega t5$ in one cycle. When the rotation angles of the first mirror 24a and the second mirror 24b are in a predetermined rotation angle range, the emission optical axis of the laser beam is in a range S4 of the rotation angle $\omega t4$ located at an upstream side of the relative move direction X1 of the machining head 12 or in a range S5 of the rotation angle $\omega t5$ located at a downstream side of the relative move direction X1 of the machining head 12. At this time, the control unit 70 controls the laser source 30 so as to emit the laser beam at the first output value.

When the rotation angles of the first mirror 24a and the second mirror 24b are out of the predetermined rotation angle range, the emission optical axis of the laser beam is in a rotation angle range S6 and a rotation angle range S7 (sections indicated by narrow lines in FIG. 4B) other than the range S4 of the rotation angle $\omega t4$ and other than the range S5 of the rotation angle $\omega t5$. At this time, the control unit 70 controls the laser source 30 so as to emit the laser beam at the second output value smaller than the first output value.

FIG. 4C is a schematic view showing a path of the emission optical axis of a laser beam formed by emitting the laser beam in a range belonging to an intended route of laser beam irradiation (a spiral pattern in its entirety) and corresponding to ranges of two rotation angles $\omega t8$ and $\omega t9$ in one cycle. When the rotation angles of the first mirror 24a and the second mirror 24b are in a predetermined angle range, the emission optical axis of the laser beam is in a range S8 of the rotation angle $\omega t8$ located at an upstream side of the relative move direction X1 of the machining head 12 or in a range S9 of the rotation angle ωt9 located at a downstream side of the relative move direction X1 of the machining head 12. At this time, the control unit 70 controls the laser source 30 so as to emit the laser beam at the first output value.

When the rotation angles of the first mirror 24a and the second mirror 24b are out of the predetermined angle range, the emission optical axis of the laser beam is in a rotation angle range S10 and a rotation angle range S11 (sections indicated by narrow lines in FIG. 4C) other than the range S8 of the rotation angle ωt8 and other than the range S9 of the rotation angle ωt9. At this time, the control unit 70 controls the laser source 30 so as to emit the laser beam at the second output value smaller than the first output value.

Figure 5A:
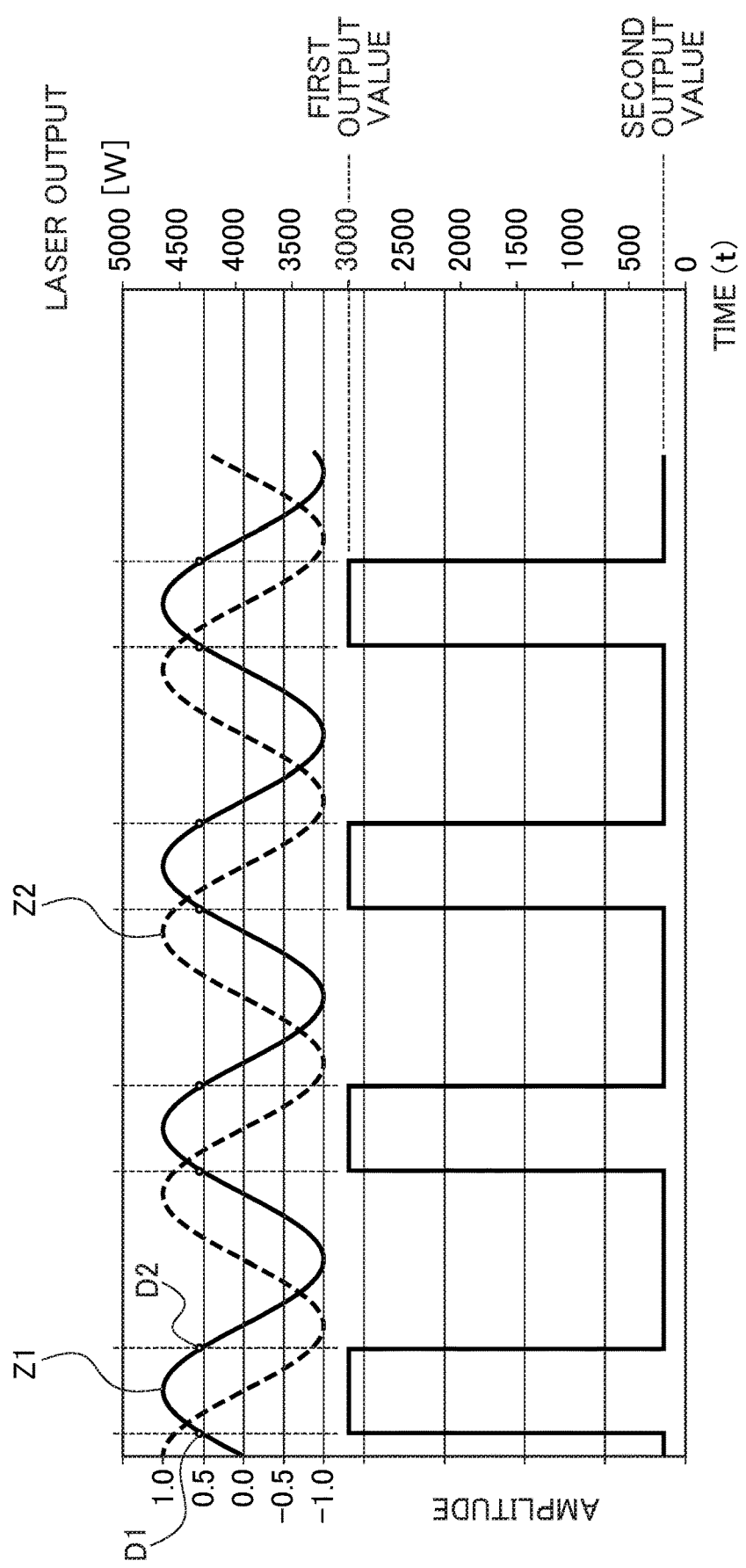
FIG. 5A is a graph showing a relationship between changes in the rotation angles of a first mirror and a second mirror forming the laser machine according to the embodiment of the present invention and timing of laser output.

FIG. 5A is a graph showing a relationship between the rotation angles of the first mirror 24a and the second mirror 24b and timing of laser output. FIG. 5A includes a graph about an angle curve Z1 of the first mirror 24a, a graph about an angle curve Z2 of the second mirror 24b, and a graph about an output value applied to the laser source 30 from the control unit 70. The control unit 70 executes control so as to emit a laser beam from the laser source 30 based on the rotation angle of the first mirror 24a. Here, the control unit 70 executes control so as to output the laser beam with irradiation output from the laser source 30 set at the first output value in a region where the rotation angle of the first mirror 24a is larger than a half of an amplitude. The control unit 70 executes control so as to output the laser beam with irradiation output from the laser source 30 set at the second output value in a region where the rotation angle of the first mirror 24a is the half of the amplitude or less.

The first output value is an output value to be output when the first mirror 24a and the second mirror 24b are in a predetermined rotation angle range. In the example of FIG. 5A, the first output value is 3000 [W], for example. The second output value is an output value to be output when the first mirror 24a and the second mirror 24b are out of the predetermined rotation angle range. The second output value is smaller than the first output value. In the example of FIG. 5A, the second output value is 200 [W], for example. The second output value can be set at 0 [W] (output can be set off). As typical examples for laser welding, in many cases, an entire width of an irradiation intended route, the rotation number of an optical part, and the move speed of a machining head and that of a workpiece relative to each other are set in the following ranges respectively: from 1 to 20 mm, from 60 to 60000 rpm, and from 0.1 to 20 m/min.

Figure 5B:
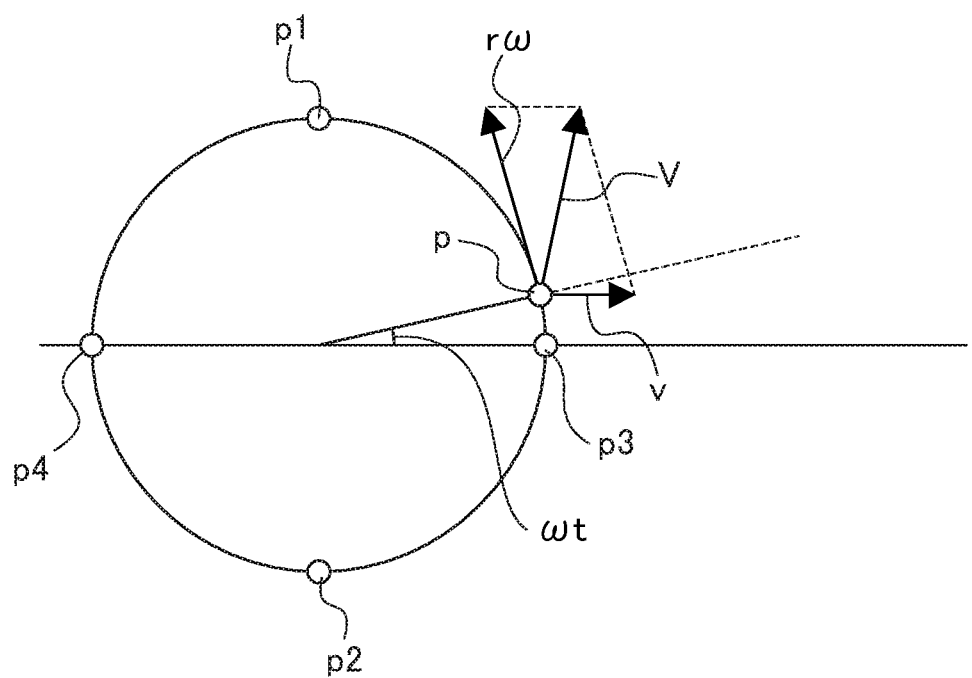
FIG. 5B is a conceptual view showing an actual move speed of a laser irradiation point in the laser machine according to the embodiment of the present invention.
Figure 5C:
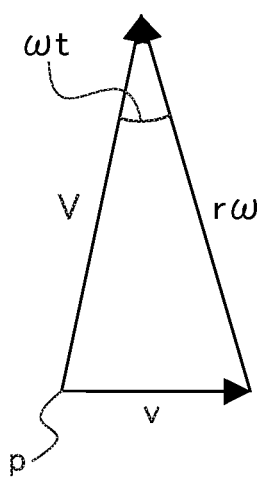
FIG. 5C is a conceptual view showing an actual move speed of a laser irradiation point in the laser machine according to the embodiment of the present invention.

FIG. 5B is a schematic view showing an actual move speed of a laser irradiation point p in the laser machine 100. FIG. 5C is a schematic view showing a relationship determined in the laser machine 100 between an actual move speed V of the laser irradiation point p, a relative move speed v of the machining head 12, and a tangential speed rω at the laser irradiation point p. The control unit 70 controls the laser source 30 so as to change a condition for laser beam emission based on the absolute value of a composite speed (the actual move speed V of an irradiation point) obtained by combining the relative move speed v in the relative move direction X1 in which the machining head 12 is moved relative to the workpiece 60 and the tangential speed rω at which an emission optical axis (see the laser irradiation point p) is rotated.

Figure 5D:
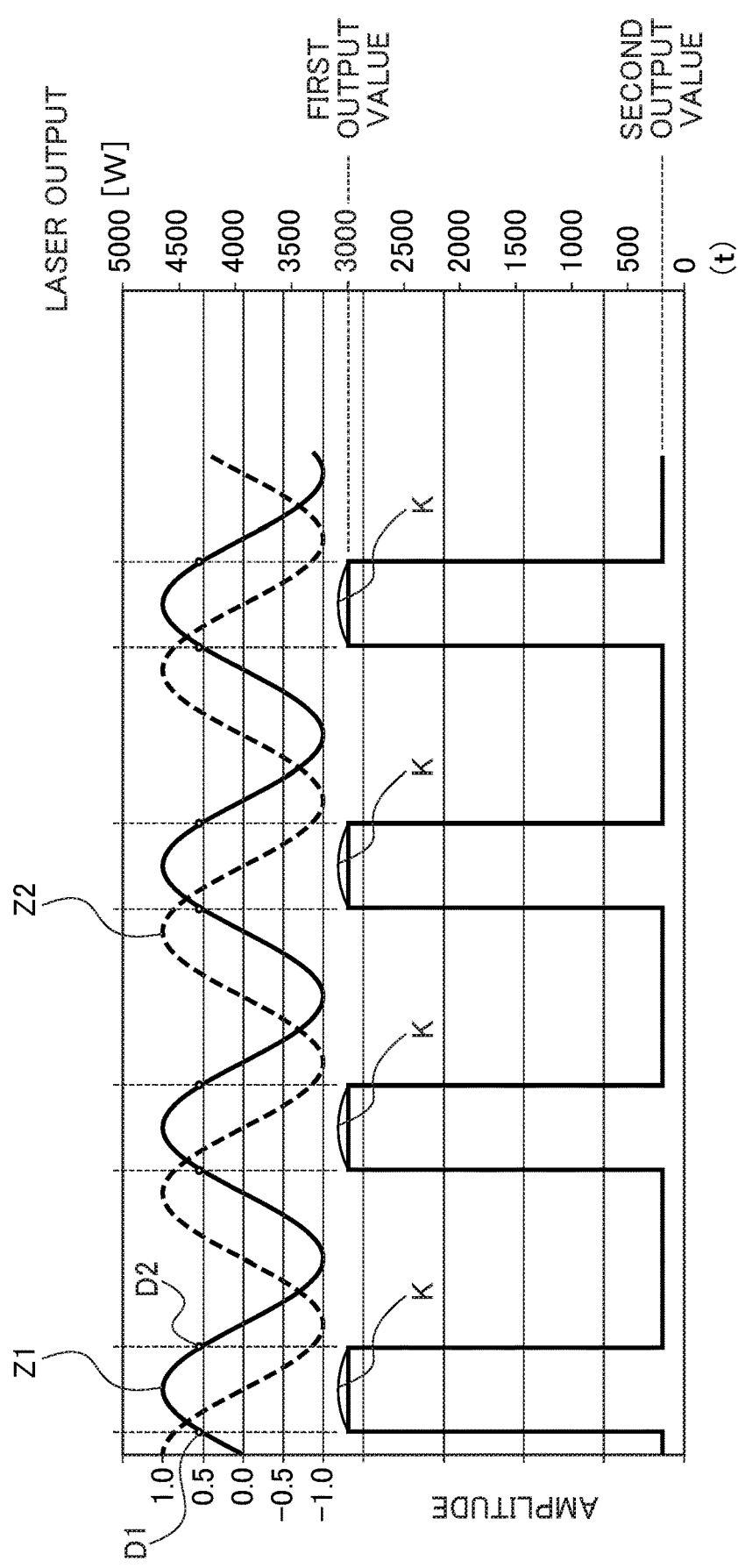
FIG. 5D is a graph showing power control executed when a laser beam is output at a first output value from a laser source forming the laser machine according to the embodiment of the present invention.

FIG. 5D is a graph showing a relationship between the rotation angles of the first mirror 24a and the second mirror 24b and timing of laser output determined when a condition for laser beam irradiation is changed based on an actual move speed of the laser irradiation point p. The control unit 70 controls the laser source 30 in such a manner that emission output from the laser source 30 is changed to gently become greater than the first output value in response to increase in the tangential speed rω of the emission optical axis of a laser beam (see a power controlled section K in FIG. 5D), and that emission output from the laser source 30 is changed to gently approach the first output value in response to reduction in the tangential speed rω of the emission optical axis of the laser beam (see the power controlled section K in FIG. 5D).

FIGS. 6A to 6D are schematic views each showing a relationship between a scanning direction of the machining head 12 and the range of laser beam irradiation. The control unit 70 controls the laser source 30 so as to change a rotation angle range for outputting a laser beam at the first output value based on the relative move direction X1 in which the machining head 12 is moved relative to the workpiece 60.

A predetermined rotation angle range will be described in detail below. The relative move direction X1 in which the machining head 12 moves relative to the workpiece 60 is orthogonal at an orthogonal point J to a rotary scanning direction R1 in which the emission optical axis of a laser beam is rotated. The control unit 70 controls the laser source 30 so as to output a laser beam from the laser source 30 at the first output value in a predetermined angle range from the orthogonal point J to an upstream point J1 upstream from the orthogonal point J in a rotary scanning direction of the emission optical axis of the laser beam and in a predetermined angle range from the orthogonal point J to a downstream point J2 downstream from the orthogonal point J in the rotary scanning direction of the emission optical axis of the laser beam.

Figure 6A:
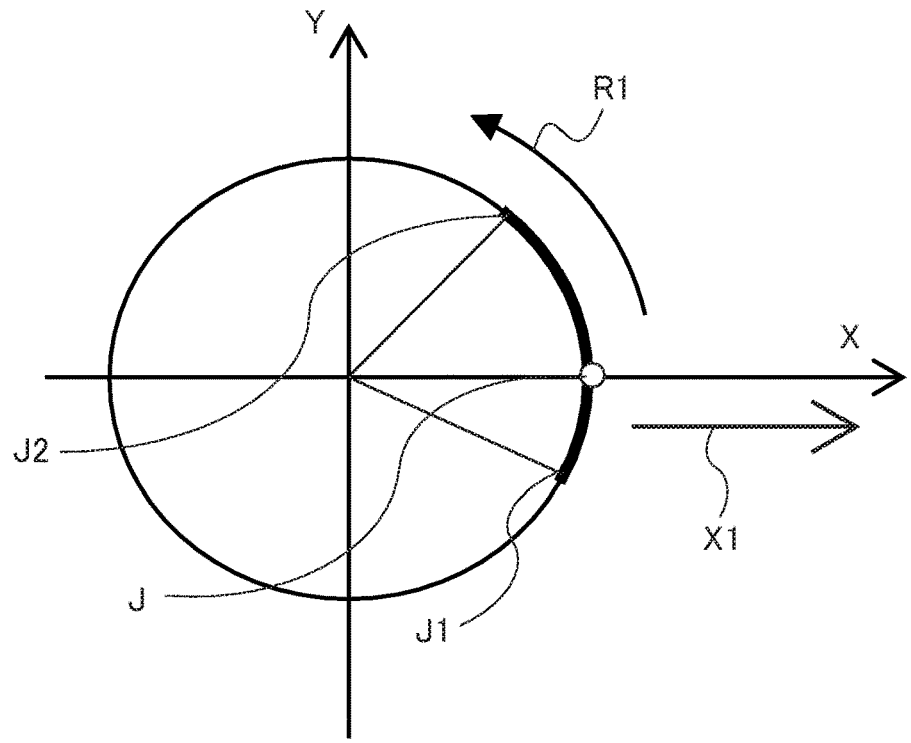
FIG. 6A is a schematic view showing a relationship between a relative move direction of the machining head and the range of laser beam irradiation.

As shown in FIG. 6A, while the machining head 12 makes relative movement in the relative move direction X1 of the X-axis direction, a laser beam is applied at the first output value to a range extending from the upstream point J1 to the downstream point J2 in the rotary scanning direction R1. This will be described simply. The laser beam is output at the first output value along an arc as a part of a circular path of the laser beam and on the part of a direction in which the machining head 12 makes relative movement. While the machining head 12 makes relative movement in the relative move direction X1 along the X-axis direction, the laser beam is output at the second output value in a range (a range in which the laser beam moves forward in the rotary scanning direction R1 from the downstream point J2 to the upstream point J1) other than the foregoing predetermined rotation angle range.

Figure 6B:
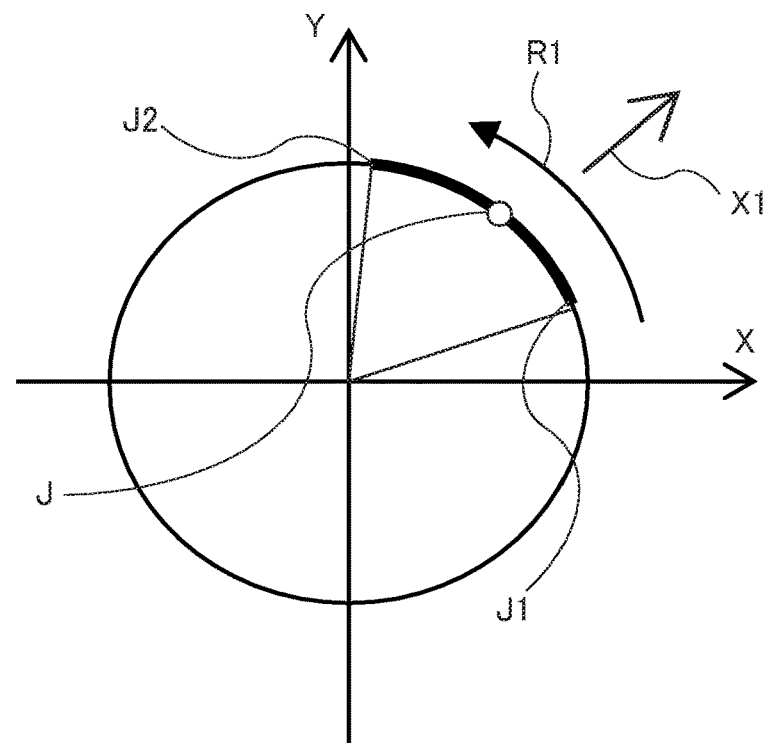
FIG. 6B is a schematic view showing a relationship between a relative move direction of the machining head and the range of laser beam irradiation.

As shown in FIG. 6B, while the machining head 12 makes relative movement in a direction of about 45° with respect to the X axis, the control unit 70 also controls the laser source 30 so as to output a laser beam at the first output value in the range of laser beam irradiation orthogonal to the relative move direction X1 of the machining head 12.

Figure 6C:
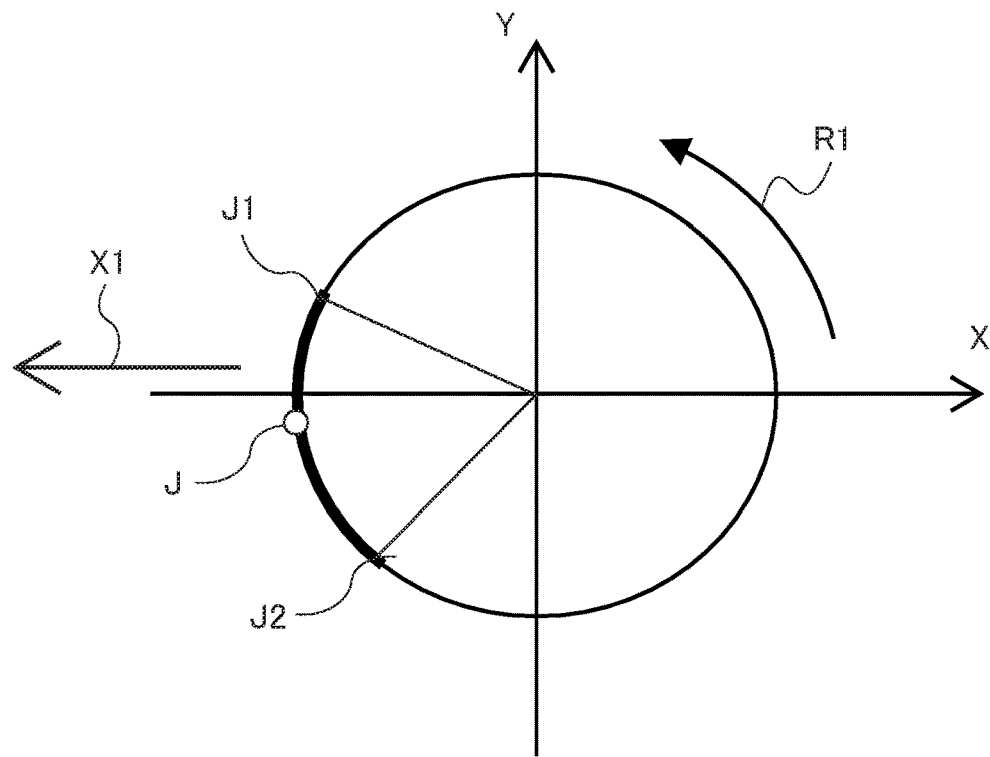
FIG. 6C is a schematic view showing a relationship between a relative move direction of the machining head and the range of laser beam irradiation.

A shown in FIG. 6C, while the machining head 12 makes relative movement in the negative direction of the X axis, the control unit 70 also controls the laser source 30 so as to output a laser beam at the first output value in the range of laser beam irradiation orthogonal to the relative move direction X1 of the machining head 12.

Figure 6D:
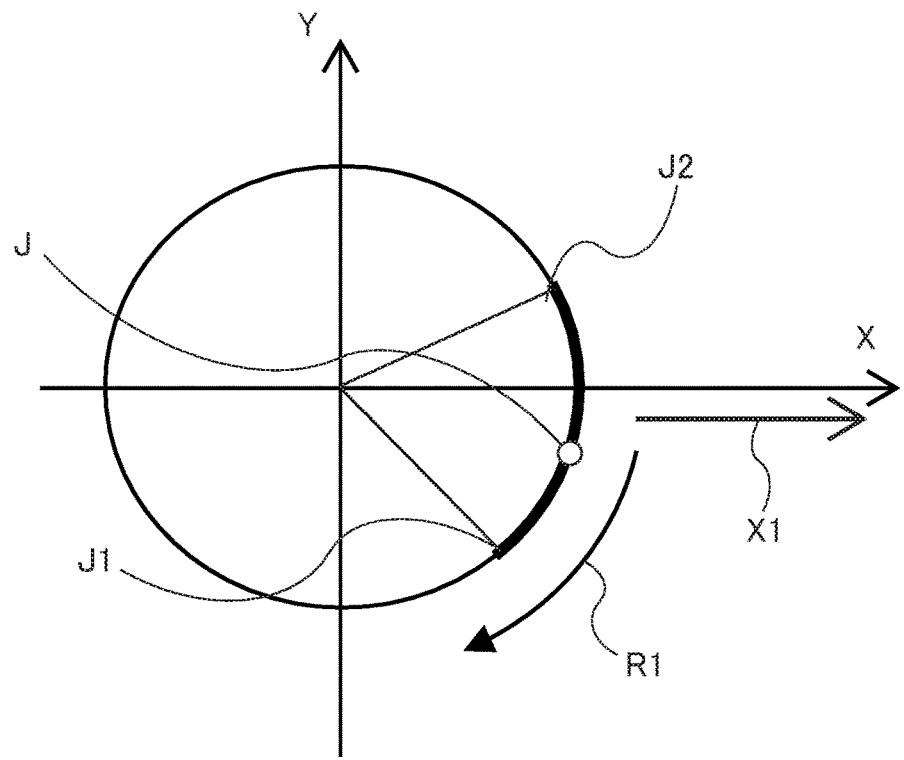
FIG. 6D is a schematic view showing a relationship between a relative move direction of the machining head and the range of laser beam irradiation.

As shown in FIG. 6D, while the machining head 12 makes relative movement in the X-axis direction and a laser beam moves clockwise, the control unit 70 also controls the laser source 30 so as to output a laser beam at the first output value in the range of laser beam irradiation orthogonal to the relative move direction X1 of the machining head 12.

Advantageous Effects of Embodiment

The laser machine 100 of the embodiment achieves the following effects, for example. The laser machine 100 of the embodiment includes: the machining head 12 including the laser source 30 that emits a laser beam, the first mirror 24a and the second mirror 24b as optical parts allowing reflection of the laser beam LL or allowing the laser beam LL to pass through, while being rotatable about the rotary axes W1 and W2 respectively, and the third lens 23 as a focusing optical system that focuses the laser beam LL; the moving mechanism 50 that allows the machining head 12 and the workpiece 60 as a machining target to be machined with the laser beam LL to move relative to each other; and the control unit 70 that controls rotations of the optical parts 24a and 24b in such a manner that an irradiation intended position to be reached by an emission optical axis when the laser beam LL is emitted to the workpiece 60 moves in a curvilinear pattern or a linear pattern, controls movement by the moving mechanism 50 so as to move the machining head 12 and the workpiece 60 relative to each other, and controls emission output from the laser source 30 so as to change a condition for emitting the laser beam LL based on the rotation angles of the optical parts 24a and 24b.

Thus, a condition for laser beam emission can be changed for each range along a path of a laser beam emission position that is to change in response to curvilinear motion or linear reciprocating motion of the irradiation intended position of the laser beam generated by the rotations of the first mirror 24a and the second mirror 24b, and the movement of the machining head 12 and that of the workpiece 60 relative to each other. As a result, according to laser machining by the laser machine 100, an already machined section will not be irradiated with a laser beam repeatedly, so that unintended laser machining can be avoided. Further, only a section on a workpiece scanned with a laser irradiation point at a preferable scanning speed can be subjected to machining, thereby achieving thigh-quality laser machining. In this way, laser machining can be performed under a machining condition allowing a favorable machining speed and favorable laser irradiation. This makes it possible to achieve a favorable machining result from laser welding, laser quenching, laser marking, laser cleaning, or laser ablation, for example.

In the laser machine 100 of the embodiment, the condition for emitting the laser beam is fulfilled by setting emission output from the laser source 30 at the first output value if the rotation angles of the first mirror 24a and the second mirror 24b are in a predetermined rotation angle range. Further, the condition for emitting the laser beam is fulfilled by setting emission output from the laser source 30 at the second output value smaller than the first output value or off if the rotation angles of the first mirror 24a and the second mirror 24b are out of the predetermined rotation angle range. This makes it possible to perform laser machining with a laser beam at a preferable scanning speed, while influence caused by a laser beam at an inappropriate scanning speed can be reduced.

In the laser machine 100 of the embodiment, the rotation angle range for laser beam irradiation is changed based on the relative move direction X1 in which the machining head 12 moves relative to the workpiece 60. More specifically, the control unit 70 controls the laser source 30 in such a manner that, when the relative move direction X1 of the machining head 12 and the rotary scanning direction R1 of the emission optical axis are substantially orthogonal to each other, the laser beam is output at the first output value (see FIGS. 6A to 6C). By doing so, laser machining of a constant quality can be achieved easily independently of a direction in which the machining head 12 moves forward relative to the workpiece 60.

If the relative move direction X1 of the machining head 12 and the rotary scanning direction R1 of the emission optical axis are substantially parallel to each other, the move speed of a laser irradiation point may be too high or too low. This reduces machining accuracy. If the relative move direction X1 of the machining head 12 and the rotary scanning direction R1 of the emission optical axis are substantially orthogonal to each other, the laser irradiation point moves at a favorable speed to increase machining accuracy. This will be explained in supplemental description below.

By referring to FIG. 4A, for example, at a point P1 on the path L1 where the relative move direction X1 of the machining head 12 and the rotary scanning direction R1 of a laser beam are aligned in the same direction, the relative move speed of the machining head 12 and the rotary scanning speed of the laser beam produce a synergistic effect to increase a laser scanning speed. By contrast, at a point P2 on the path L1 where the relative move direction X1 of the machining head 12 and the rotary scanning direction R1 of the laser beam are opposite to each other, the relative move speed of the machining head 12 and the rotary scanning speed of the laser beam produce a canceling effect to reduce the laser scanning speed. In this way, a point is bypassed at which the relative move speed of the machining head 12 and the rotary scanning speed of the laser beam are to produce a synergistic effect or a canceling effect.

By contrast, when the relative move direction X1 of the machining head 12 and the rotary scanning direction R1 of an emission optical axis are substantially orthogonal to each other, the foregoing synergistic effect or canceling effect is not serious and a laser irradiation point moves at a favorable speed, thereby increasing machining accuracy. Thus, by employing this timing for irradiating a rotation angle range for a laser beam suitable for laser machining with the laser beam at the first output value, the workpiece 60 can be machined favorably. Even if a laser beam to be applied is increased or reduced when the relative move direction X1 of the machining head 12 and the rotary scanning direction R1 of the emission optical axis are substantially parallel to each other, an excessive or insufficient quantity of heat input can still be avoided by applying the laser beam at equal intervals.

In the laser machine 100 of the embodiment, the control unit 70 controls emission output from the laser source 30 so as to change the condition for emitting the laser beam based on the absolute value of a composite speed obtained by combining the relative move speed v at which the machining head 12 is moved relative to the workpiece 60 and the tangential speed rω at which scanning with the emission optical axis proceeds in a curvilinear pattern. This makes it possible to achieve a constant quantity of heat input per unit length independently of the relative move speed v of the machining head 12 and the tangential speed rω of the emission optical axis. Thus, insufficient or excessive heat input can be avoided.

[First Modification]

In a laser machine according to a first modification, the control unit 70 executes control so as to rotate the first mirror 24a and the second mirror 24b at the same rotation number and in the same direction while maintaining the respective phases of the first mirror 24a and the second mirror 24b. In this way, in the laser machine of the first modification, the first mirror 24a and the second mirror 24b are rotated while the phases of the first mirror 24a and the second mirror 24b are maintained. This makes it possible to form a large circle or a small circle using a phase shift.

[Second Modification]

FIG. 7A is a schematic view showing a relationship between the relative move direction X1 in which the machining head 12 in a laser machine according to a second modification is moved relative to the workpiece 60 and a direction Y in which the emission optical axis of a laser beam is moved. The control unit 70 executes control so as to rotate the first mirror 24a and the second mirror 24b at the same rotation number and in opposite directions by rotating the first motor 25a and the second motor 25b at the same rotation number and in opposite directions.

Thus, a laser beam is reflected by the two mirrors, the first mirror 24a and the second mirror 24b, and then makes linear reciprocating motion on the workpiece 60. The control unit 70 sets the relative move direction X1 in which the machining head 12 is moved relative to the workpiece 60 (a direction in which the workpiece 60 is fed) as a vertical direction, and sets a direction Y1 in which the emission optical axis is moved as a vertical direction. A path formed by the laser beam on the workpiece 60 is drawn in a zigzag pattern extending in the X-axis direction. This laser beam is applied only to a central part of the linear reciprocating motion. By doing so, laser machining proceeds only at a favorable move speed of a laser irradiation point, so that a high-quality machining result can be obtained.

[Third Modification]

Figure 7B:
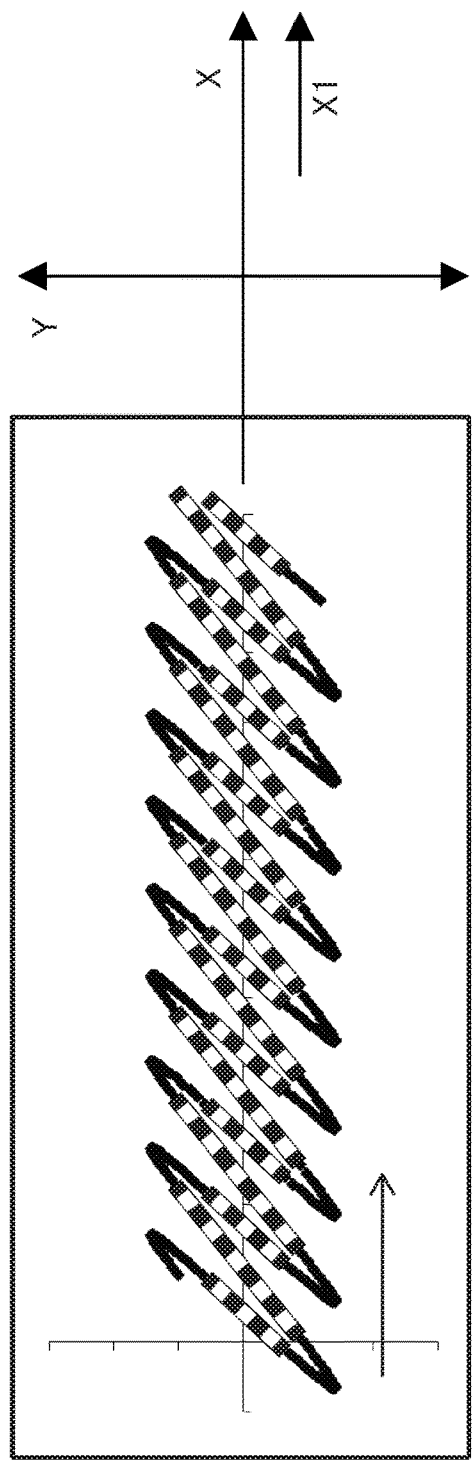
FIG. 7B is a schematic view showing a relationship between a relative move direction of a machining head in a laser machine according to a third modification of the present invention and a direction in which the emission optical axis of a laser beam makes linear reciprocating motion.
Figure 7C:
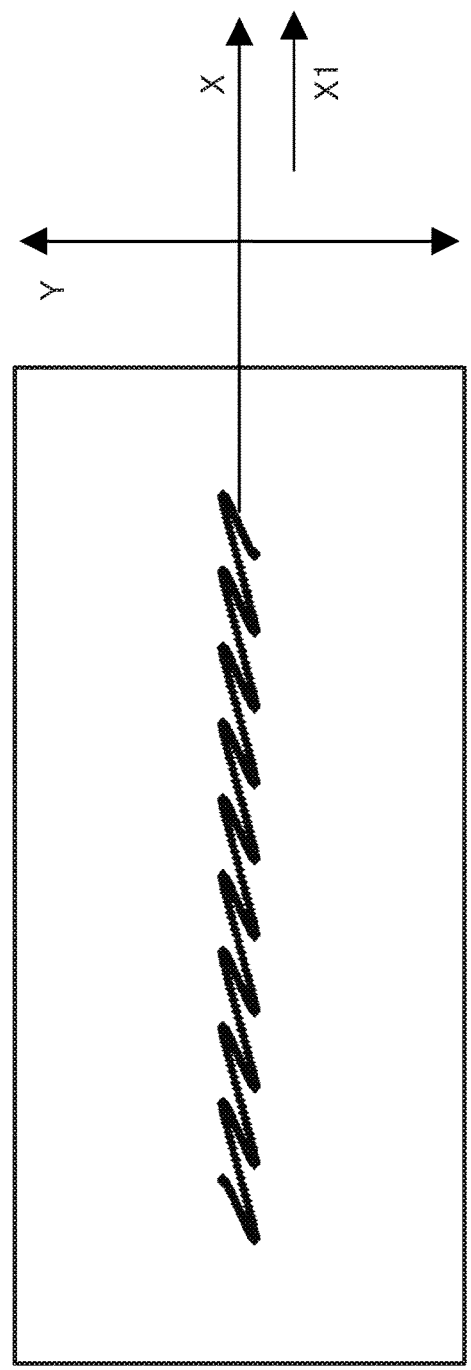
FIG. 7C is a schematic view showing a relationship between a relative move direction of the machining head in the laser machine according to the third modification of the present invention and a direction in which the emission optical axis of a laser beam makes linear reciprocating motion.

FIG. 7B is a schematic view showing a relationship between the relative move direction X1 in which the machining head 12 in a laser machine according to a third modification is moved relative to the workpiece 60 and a direction Y2 in which the emission optical axis of a laser beam makes linear reciprocating motion. FIG. 7C is a schematic view showing a relationship between the relative move direction X1 in which the machining head 12 in the laser machine according to the third modification is moved relative to the workpiece 60 and a direction Y3 in which the emission optical axis of a laser beam makes linear reciprocating motion. In the third modification, the control unit 70 executes control so as to change the phases of the multiple mirrors 24a and 24b rotating in opposite directions based on the relative move direction X1 in which the machining head 12 is moved relative to the workpiece 60 and a direction in which an emission optical axis makes linear reciprocating motion. In FIG. 7B, for distinction from a section of a path indicated by a narrow line, a section of the path indicated by a bold line is composed of black rectangles and white rectangles arranged alternately.

The control unit 70 controls the machining head 12 so as to form an angle of 45° between the relative move direction X1 in which the machining head 12 is moved relative to the workpiece 60 and the direction Y2 in which the emission optical axis of a laser beam is moved, as shown in FIG. 7B, by changing the foregoing phases. By doing so, a path of the laser beam can be drawn on the workpiece 60. The control unit 70 also controls the machining head 12 so as to form an angle of 11.25° between the relative move direction X1 in which the machining head 12 is moved relative to the workpiece 60 and the direction Y3 in which the emission optical axis of a laser beam is moved, as shown in FIG. 7C, by further changing the foregoing phases. By doing so, a path of the laser beam can be drawn on the workpiece 60.

In this way, agreement can be made between the relative move direction of the machining head 12 and a direction in which the emission optical axis of a laser beam makes linear reciprocating motion.

[Fourth Modification]

In a laser machine according to a fourth modification, the control unit 70 executes control so as to change the rotation numbers of the first mirror 24a and the second mirror 24b based on a relative move speed at which the machining head 12 is moved relative to the workpiece 60 and a tangential speed at which scanning with an emission optical axis proceeds in a curvilinear pattern.

Thus, even if the speed of laser scanning changes, an irradiation pitch remains unchanged. Specifically, when the relative move speed of the machining head 12 is high, the emission optical axis of a laser beam can be rotated at a high speed. If the relative move speed of the machining head 12 is low, the emission optical axis of the laser beam can be rotated at a low speed.

[Fifth Modification]

Figure 9A:
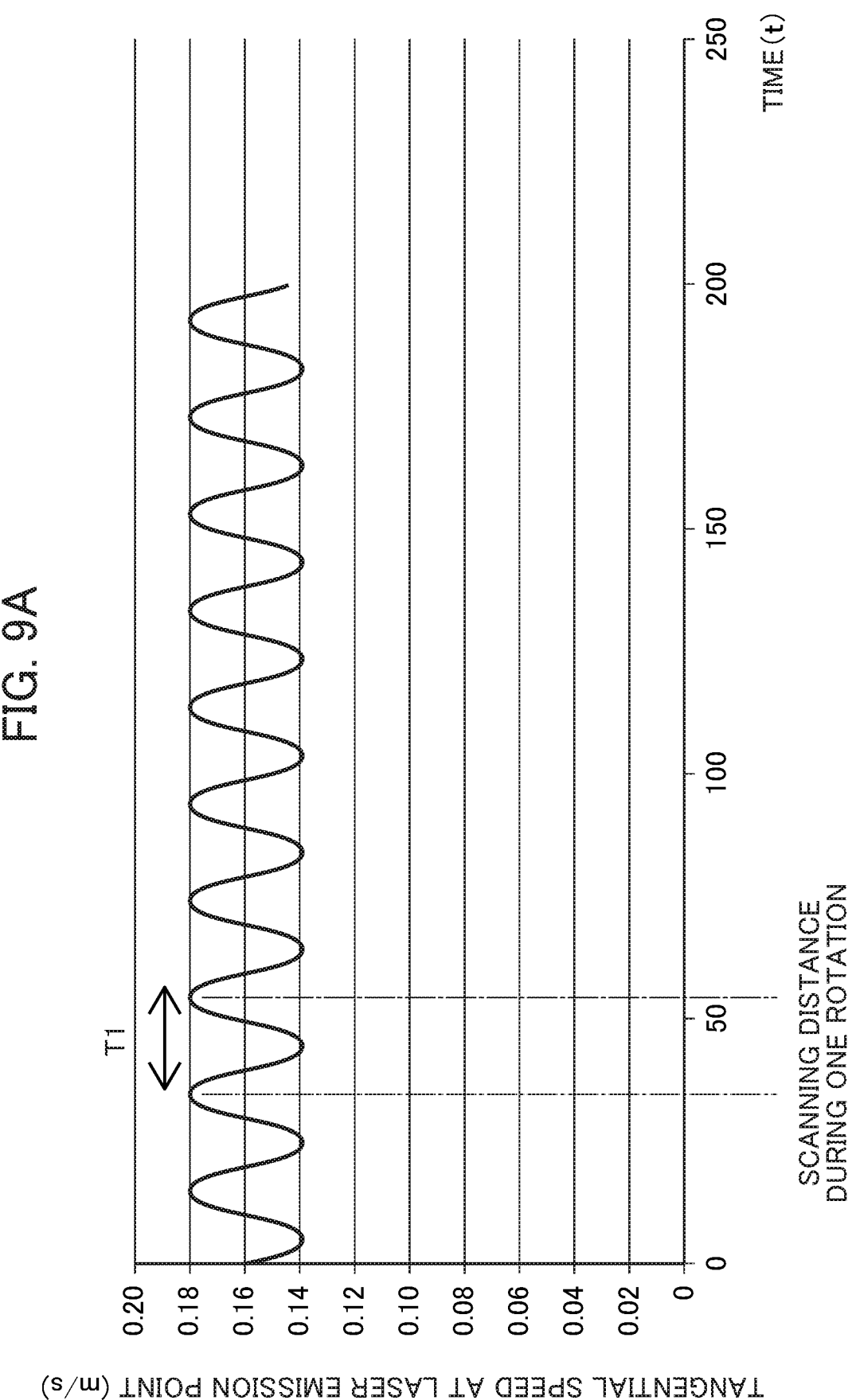
FIG. 9A is a graph showing a relationship of a tangential speed at a laser irradiation point responsive to input of the width of laser machining by the laser machine according to the fifth modification of the present invention with time.

FIG. 8A is a schematic view showing a path of a laser beam formed by input of a narrow laser machining width to a laser machine according to a fifth modification. FIG. 8B is a schematic view showing a path of a laser beam formed by input of a wide laser machining width. FIG. 9A is a graph showing a relationship of a tangential speed at a laser irradiation point responsive to setting of a narrow laser machining width in the laser machine according to the fifth modification with time. FIG. 9B is a graph showing a relationship of a tangential speed at a laser irradiation point responsive to setting of a wide laser machining width with time.

It is assumed, by referring to FIGS. 5B and 5C, that the laser irradiation point p of a laser beam starts from (r, 0) on an XY coordinate plane when t is zero, rotates at an angular speed $\omega$, and moves at a speed (v, 0). A vector of the laser irradiation point p at the time t from the center of a circle is expressed as $(r^*\cos(\omega t), r^*\sin(\omega t))$. Thus, a position p(t) is expressed by the following formula:

$$p(t)=(vt+r^*\cos(\omega t),r^*\sin(\omega t)).$$

As a result of first-order differentiation of this formula with respect to the time t, a speed vector is produced. Then, the following formula is established:

$$p'(t)=(v-r\omega^*\sin(\omega t),r\omega^*\cos(\omega t)).$$

The absolute value of this formula shows an actual scanning speed of an irradiation point. Then, by defining the actual scanning speed of this irradiation point as V, the following formula is established:

$$V^2=v^2-2vr\omega^*\sin(\omega t)+r^2\omega^2*\sin^2(\omega t)+r^2\omega^2*\cos^2(t).$$

$$\text{Therefore, } V^2=v^2-2v\omega^*\sin(\omega t)+r^2\omega^2 \qquad (1).$$

At the position of a laser irradiation point p1 in FIG. 5B, $\omega t$ becomes $\pi/2$. Then, the following formula is established:

$$V^2=v^2-2vr\omega+r^2\omega^2.$$

In this case, the actual scanning speed V of the irradiation point becomes minimum. At the position of a laser irradiation point p2 in FIG. 5B, $\omega t$ becomes $3\pi/2$. Then, the following formula is established:

$$V^2=v^2+2vr\omega+r^2\omega^2.$$

In this case, the actual scanning speed V of the irradiation point becomes maximum. At the position of a laser irradiation point p3 and the position of a laser irradiation point p4 in FIG. 5B, ωt becomes zero and π respectively. Then, the following formula is established:

$$V^2 = v^2 + r^2\omega^2 \qquad (2).$$

In this case, V in the formula (2) means the average of the actual scanning speed of the irradiation point.

A double of a radius, specifically, 2r corresponds to the amplitude of a path of laser irradiation, in other words, a laser machining width. To avoid change in the average V of a scanning speed and the relative move speed v of the machining head 12 even if a laser machining width is changed, specifically, even if r is varied, ω may be calculated based on r. In this case, the angular speed ω and the radius r can be calculated based on a desired laser machining width.

In response to input of a narrow machining width (2r1) in FIG. 8A, for example, ω becomes greater with reduction in r and ω becomes smaller with increase in r, as understood from the foregoing formula (2). A relationship of T=2π/ω is established between a cycle and an angular speed. Thus, T becomes smaller with increase in ω, and T becomes greater with reduction in ω. As a result, ω becomes greater and T becomes smaller with reduction in r, whereas ω becomes smaller and T becomes greater with increase in r.

As understood from the foregoing, if a laser of the narrow laser machining width 2r1 is to be emitted as shown in FIG. 8A, a short cycle is set as a cycle T1 for the emission optical axis of the laser, as shown in FIG. 9A. If a laser of a wide laser machining width 2r2 is to be emitted as shown in FIG. 8B, a long cycle is set as a cycle T2 for the emission optical axis of the laser, as shown in FIG. 9B. As understood from the formula (2), at a section to be irradiated with a laser beam in a direction orthogonal to the direction of relative move of the machining head 12, specifically, at a section and its vicinity where ωt is 0, π, 2π, 3π, . . . , nπ (n is an integer), laser machining can be performed at any laser machining width without changing the scanning speed V of a laser beam.

The foregoing case is described merely as an example. For example, a laser machining width can be changed while a pitch and a tangential speed remain unchanged.

In the configuration of the fifth modification, by designating a laser machining width, the magnitude of the amplitude of curvilinear motion or linear reciprocating motion of a laser beam is calculated and set automatically. An operator is only required to designate a laser machining width.

The foregoing embodiment is a preferred embodiment of the present invention. However, the scope of the present invention should not be limited only to the foregoing embodiment, but the present invention can be carried out in aspects containing various types of changes within a range not deviating from the substance of the present invention (including the foregoing first to fifth modifications).

Figure 10A:
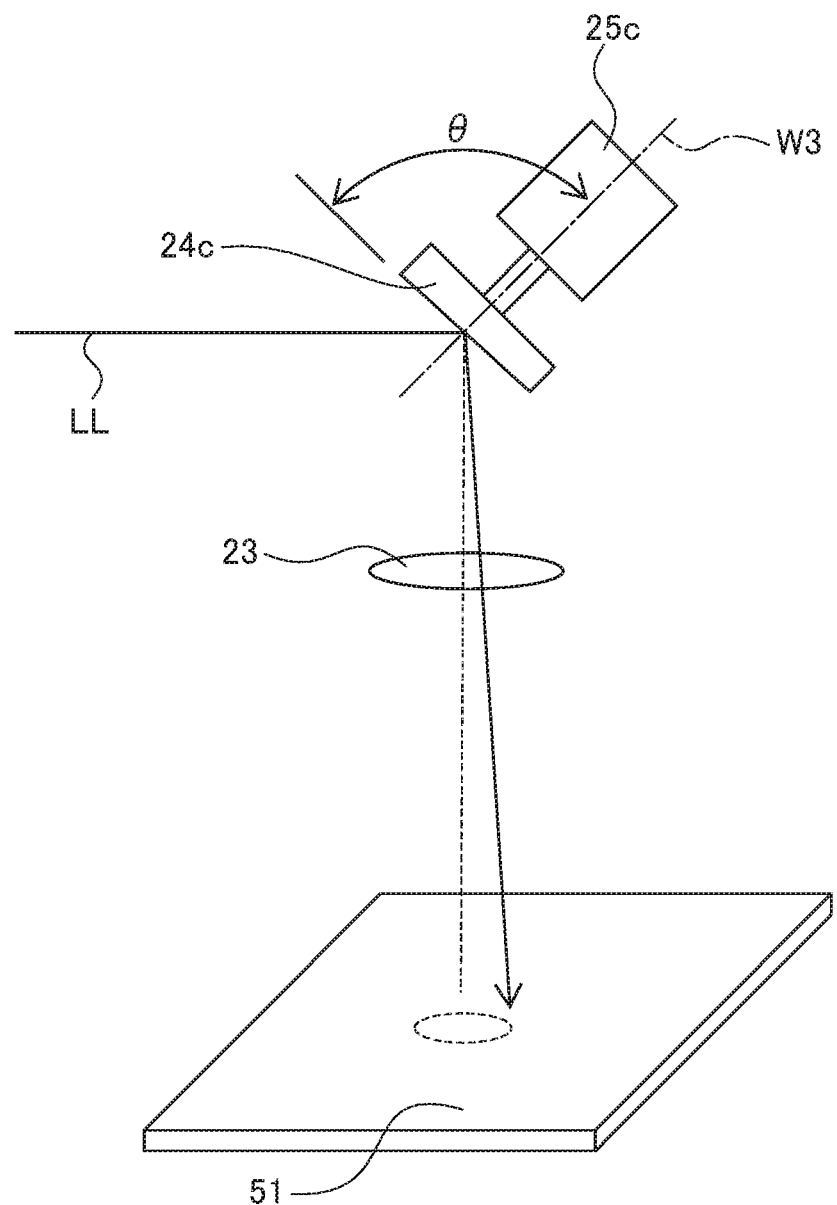
FIG. 10A is a schematic perspective view showing the configuration of a part of a laser machine according to a different modification of the present invention.

For example, as shown in FIG. 10A, one mirror 24c and one motor 25c may be used, instead of the first mirror 24a and the second mirror 24b, and the first motor 25a and the second motor 25b of the machining head 12 described above. The mirror 24c and the motor 25c rotate about a rotary axis W3. Even in this configuration, a path of a laser beam irradiation comparable to the foregoing path shown in FIG. 4 can still be formed. Specifically, the number of optical parts may be one, or two or more.

Figure 10B:
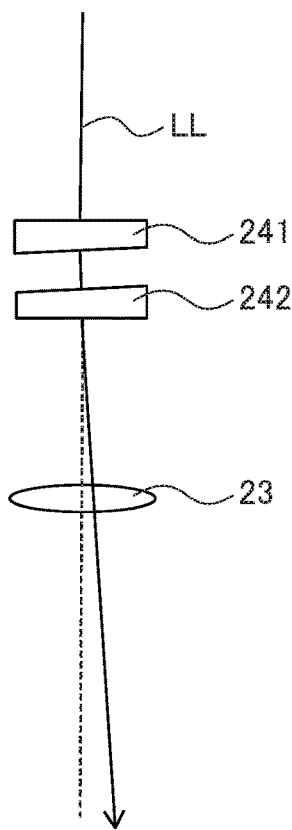
FIG. 10B is a schematic view showing the configuration of a part of a laser machine according to a different modification of the present invention.
Figure 10C:
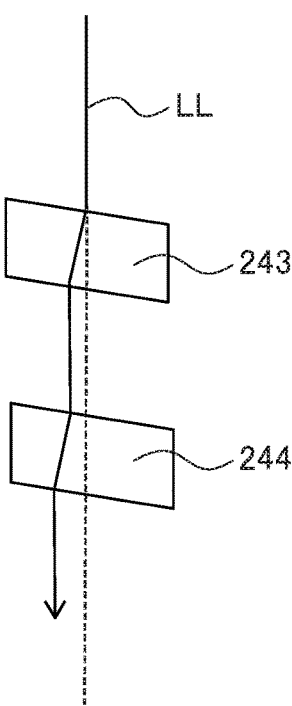
FIG. 10C is a schematic view showing the configuration of a part of a laser machine according to a different modification of the present invention.

As shown in FIG. 10B, a first prism 241 and a second prism 242 may be used as optical parts allowing a laser beam to pass through, instead of the first mirror 24a and the second mirror 24b of the machining head 12 described above. For example, each of the first prism 241 and the second prism 242 may be a prism having a surface orthogonal to an optical axis and an opposite surface tilted from the surface orthogonal to the optical axis. Further, as shown in FIG. 10C, a first plate lens 243 and a second plate lens 244 may be used as optical parts allowing a laser beam to pass through, instead of the first mirror 24a and the second mirror 24b of the machining head 12 described above.

As long as the moving mechanism is capable of moving a machining head and a machining target relative to each other, the moving mechanism can be a mechanism for moving the machining target, or a mechanism for moving both the machining head and the machining target. In one configuration, an optical part rotatable about a rotary axis may be arranged downstream from a focusing optical system for focusing a laser beam, and the laser beam focused by the focusing optical system may be reflected by the optical part or passed through the optical part. The embodiment and each of the modifications may be combined, where appropriate, within a range not deviating from the substance of the present invention.

EXPLANATION OF REFERENCE NUMERALS

12 Machining head
21 First lens
22 Second lens
23 Third lens (focusing optical system)
24a First mirror (optical part)
24b Second mirror (optical part)
25a First motor
25b Second motor
30 Laser source
50 Moving mechanism
52 X-axis direction guide
53 Y-axis direction guide
60 Workpiece (machining target)
70 Control unit
100 Laser machine
L1, L2, L3 Path
LL Laser beam
R1 Rotary scanning direction
W1, W2, W3 Rotary axis
X1 Relative move direction

What is claimed is:

1. A laser machine comprising:
   a machining head including a laser source that emits a laser beam, a mirror allowing reflection of the laser beam, while being rotatable about a rotary axis, and a lens that focuses the laser beam;
   a plurality of motors that are configured to move, relative to one another, the machining head and a machining target to be machined with the laser beam; and
   a motor configured to move the mirror in order to move an irradiation intended position of an emission optical axis in a curvilinear pattern or a linear pattern,
   wherein emission output from the laser source is based on a condition for emitting the laser beam such that the emission output is configured to be set at a first output value or at a second output value smaller than the first output value,
   the condition for emitting the laser beam is based on a rotation angle of the mirror and an absolute value of a composite speed so as to achieve a constant quantity of heat input per unit length, and successively in response to changes in the absolute value of the composite speed, the composite speed being obtained by combining a relative move speed at which the machining head is moved relative to the machining target and a tangential speed at which scanning with the emission optical axis proceeds in a curvilinear pattern, the emission output is set at the second output value or off at each portion where the absolute value of the composite speed is at a maximum at which the machining head is moved in a direction parallel to the scanning with the emission optical axis in the curvilinear pattern, the emission output is set at the second output value or off at each portion where the absolute value of the composite speed is at a minimum at which the machining head is moved in a direction antiparallel to the scanning with the emission optical axis in the curvilinear pattern, and the emission output is set at the first output value at each portion where the absolute value of the composite speed is at a midpoint between the maximum and the minimum at which the machining head is moved in a direction perpendicular to the scanning with the emission optical axis in the curvilinear pattern.

2. The laser machine according to claim 1, wherein the condition for emitting the laser beam is fulfilled by setting emission output from the laser source at the first output value if the rotation angle of the mirror is in a predetermined rotation angle range, and the condition for emitting the laser beam is fulfilled by setting emission output from the laser source at the second output value or off if the rotation angle of the mirror is out of the predetermined rotation angle range.

3. The laser machine according to claim 2, wherein the rotation angle range is changed based on a relative move direction in which the machining head is moved relative to the machining target.

4. The laser machine according to claim 1, wherein the mirror includes multiple mirrors, and the multiple mirrors are rotated at the same rotation number and in the same direction while maintaining the respective phases of the multiple mirrors.

5. The laser machine according to claim 1, wherein the mirror includes multiple mirrors, and the multiple mirrors are rotated at the same rotation number and in mutually opposite directions.

6. The laser machine according to claim 5, wherein the phases of the multiple mirrors rotating in the opposite directions are changed based on a relative move direction in which the machining head is moved relative to the machining target and a direction in which the emission optical axis makes linear reciprocating motion.

7. The laser machine according to claim 1, wherein the rotation number of the mirror is changed based on a relative move speed at which the machining head is moved relative to the machining target and a tangential speed at which scanning with the emission optical axis proceeds in a curvilinear pattern.

8. The laser machine according to claim 1, wherein the magnitude of the amplitude of curvilinear motion or linear reciprocating motion of the laser beam is changed in response to input of a width of irradiation of the machining target with the laser beam.

9. The laser machine according to claim 2, wherein the laser source is configured to change the emission output to gently become greater in response to increase in the tangential speed, and changes to gently become smaller in response to reduction in the tangential speed.

10. The laser machine according to claim 1, comprising a prism or a plate lens in place of the mirror, the prism and the plate lens allowing the laser beam to pass therethrough.

11. The laser machine according to claim 1, wherein the emission output from the laser source is configured not to irradiate the laser beam at points where a relative move direction of the machining head and a curvilinear scanning direction of the emission optical axis are aligned in a same direction and at points where the relative move direction of the machining head and the curvilinear scanning direction of the emission optical axis are opposite to each other.

* * * * *